United States Patent [19]

Barkan

[11] Patent Number: 5,436,440
[45] Date of Patent: Jul. 25, 1995

[54] DIGITIZING CIRCUIT FOR A LASER SCANNER USING DIGITAL AND SYNCHRONIZING SIGNALS

[75] Inventor: Edward Barkan, Miller Place, N.Y.

[73] Assignee: Symbol Technologies, Inc., Bohemia, N.Y.

[21] Appl. No.: 241,014

[22] Filed: May 11, 1994

Related U.S. Application Data

[60] Division of Ser. No. 28,107, Mar. 8, 1993, which is a continuation-in-part of Ser. No. 721,951, Jun. 27, 1991, abandoned, which is a division of Ser. No. 510,074, Apr. 13, 1990, Pat. No. 5,059,779, which is a continuation-in-part of Ser. No. 367,335, Jun. 16, 1989, Pat. No. 5,124,539.

[51] Int. Cl.⁶ ............................................. G06K 5/00
[52] U.S. Cl. ................................................... 235/462
[58] Field of Search .......................................... 235/462

[56] References Cited

U.S. PATENT DOCUMENTS

| | | | |
|---|---|---|---|
| 3,360,659 | 12/1967 | Young | 250/236 |
| 3,685,723 | 8/1972 | Berler | 235/61.11 |
| 3,699,321 | 10/1972 | Gibson | 235/152 |
| 3,892,949 | 7/1975 | Dodson, III | 235/61.11 |
| 4,000,397 | 12/1976 | Hebert et al. | 235/61.11 |
| 4,059,224 | 11/1977 | Seligman | 235/462 |
| 4,109,316 | 8/1978 | Snyder | 365/127 |
| 4,113,343 | 9/1978 | Pole et al. | 350/3.71 |
| 4,115,703 | 9/1978 | Dobras | 250/568 |
| 4,118,675 | 10/1978 | Rahn et al. | 331/94.5 |
| 4,158,435 | 6/1979 | Nakanishi et al. | 235/463 |
| 4,160,156 | 7/1979 | Sherer | 235/463 |
| 4,182,956 | 1/1980 | Funk, Jr. et al. | 250/239 |
| 4,210,802 | 7/1980 | Sakai | 235/483 |
| 4,277,127 | 7/1981 | Smith et al. | 350/3.67 |
| 4,305,646 | 12/1981 | Bechtold | 354/5 |
| 4,356,389 | 10/1982 | Quirey et al. | 235/455 |
| 4,455,485 | 6/1984 | Hosaka et al. | 250/234 |
| 4,528,444 | 7/1985 | Hara et al. | 235/462 |
| 4,560,862 | 12/1985 | Eastman et al. | 235/467 |
| 4,570,057 | 2/1986 | Chadima, Jr. et al. | 235/472 |
| 4,578,568 | 3/1986 | Tsuzuki | 235/436 |
| 4,578,571 | 3/1986 | Williams | 235/472 |
| 4,740,675 | 4/1988 | Brosnan et al. | 235/462 |
| 4,749,879 | 6/1988 | Peterson et al. | 307/354 |
| 4,760,248 | 7/1988 | Swartz et al. | 235/472 |
| 4,795,224 | 1/1989 | Goto | 350/6.3 |
| 4,801,788 | 1/1989 | Osaka | 235/462 |
| 4,870,367 | 9/1989 | Nakase et al. | 328/168 |
| 5,061,843 | 10/1991 | Sato et al. | 235/462 |
| 5,103,080 | 4/1992 | Barkan | 235/462 |
| 5,124,539 | 6/1992 | Krichever et al. | 235/472 |
| 5,210,397 | 5/1993 | Eastman | 235/436 |
| 5,272,323 | 12/1993 | Martino | 235/462 |
| 5,294,783 | 3/1994 | Hammond, Jr. et al. | 235/462 |

FOREIGN PATENT DOCUMENTS

| | | | |
|---|---|---|---|
| 59-573 | 3/1986 | Japan | 235/462 |
| 165979 | 7/1988 | Japan | 235/462 |

*Primary Examiner*—John Shepperd
*Attorney, Agent, or Firm*—Finnegan, Henderson, Farabow, Garrett and Dunner

[57] ABSTRACT

A trigger-operated or triggerless scanner reads symbols with a first scan pattern in a first intended position of hand-held use. Either scanner may be mounted on a stand-alone fixture wherein the first scan pattern is converted to a second, different scan pattern, again for reading indicia in a second intended position of workstation use. Various signal processing digitizing circuits for faithful digital reconstruction of the symbols are disclosed.

18 Claims, 23 Drawing Sheets

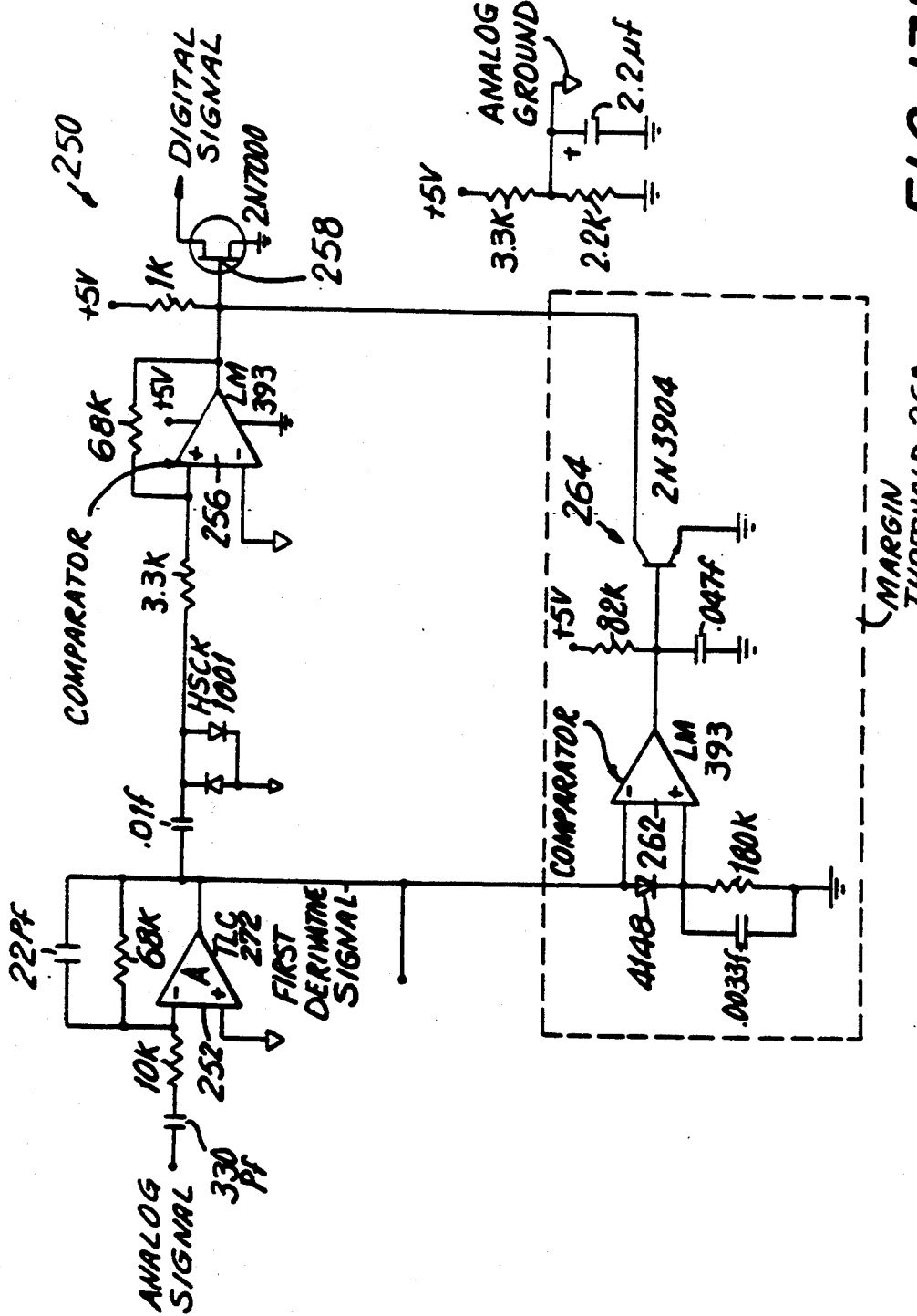

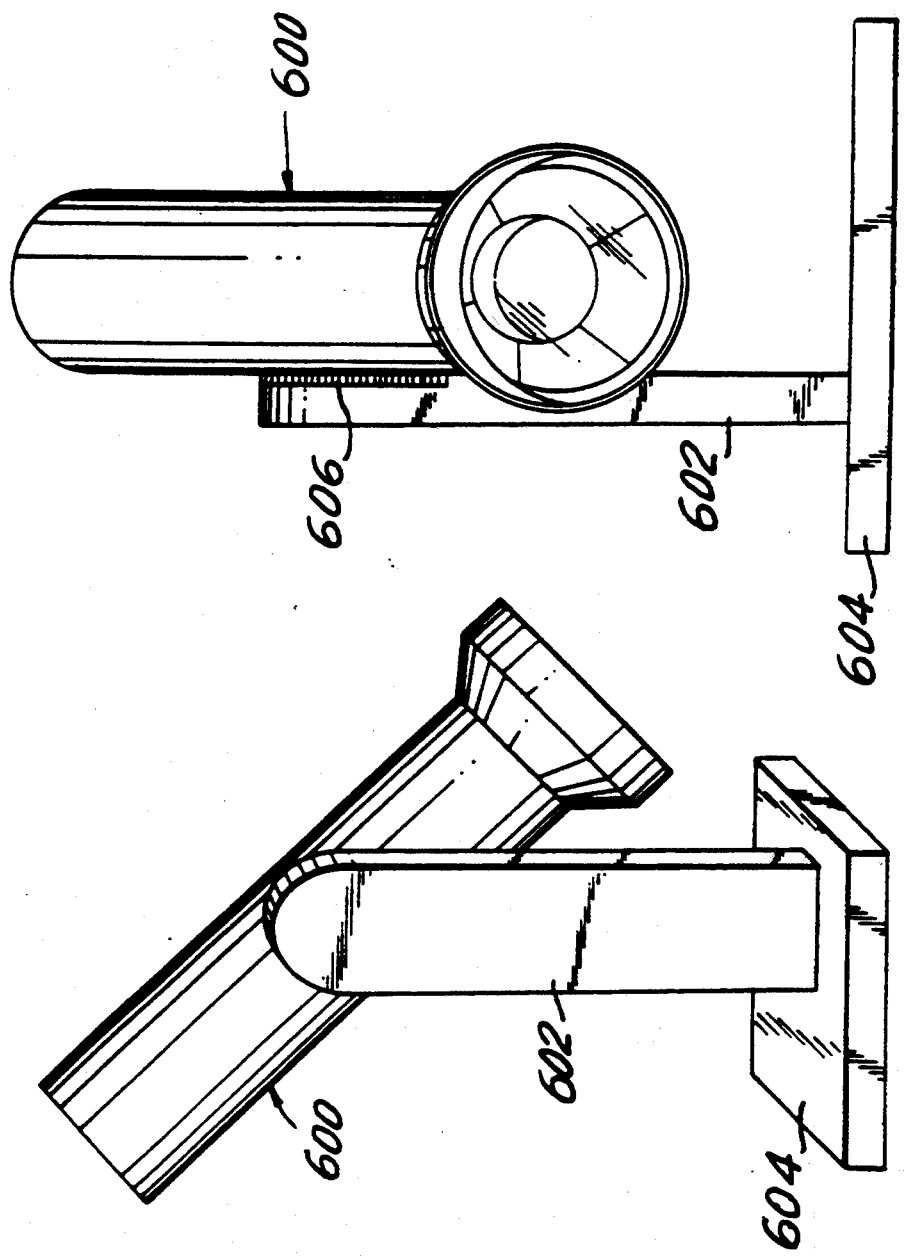

DIGITIZING CIRCUIT FOR A LASER SCANNER USING DIGITAL AND SYNCHRONIZING SIGNALS

CROSS-REFERENCE TO RELATED APPLICATIONS

This application is a divisional application of U.S. Ser. No. 028,107 filed Mar. 8, 1993, which is a continuation-in-part application of U.S. Ser. No. 721,951 filed Jun. 27, 1991, now abandoned which is a divisional application of Ser. No. 510,074, filed Apr. 13, 1990 now U.S. Pat. No. 5,059,779, which is a continuation-in-part application of U.S. Ser. No. 367,335, filed Jun. 16, 1989, now U.S. Pat. No. 5,124,539. The contents of all the aforesaid applications are relied upon and incorporated by reference.

BACKGROUND OF THE INVENTION

1. Field of the Invention

This invention generally relates to a hand-held laser scanner for scanning and reading coded indicia, e.g. bar code symbols, with a first scan pattern and, more particularly, to a stand-alone fixture for selectively supporting the laser scanner thereon and, when so supported, for converting the first scan pattern to a different, second scan pattern operative for scanning and reading indicia located exteriorly of the fixture. Still more particularly, this invention relates to converting a hand-held scanner having a trigger, that initiates reading in a triggered mode when manually actuated, to a triggerless mode by simply mounting the scanner on the fixture, and also to supporting both triggered and triggerless hand-held scanners in the fixture, as well as to triggerless scanners in general. Furthermore, various digitizer circuits are disclosed for signal processing.

2. Description of Related Art

Hand-held laser scanners are well known. See, for example, U.S. Pat. Nos. 4,387,297; 4,409,470 and 4,806,742 as being representative of the art. A stand-alone laser scanning workstation, for example, see U.S. Pat. No. 4,369,361, having built-in laser, scanning and sensor components is also known. It is also known to provide a so-called "dummy" stand or fixture on which a hand-held laser scanner is optionally supported when not being held or used by a human operator. Such dummy stands typically serve mainly as convenient tabletop mounts or equipment perches to provide ready access of the scanner to the operator. In some cases, for example, see U.S. Pat. No. 5,105,070, the dummy stand is useful in changing the direction of a laser beam emitted by the supported scanner.

Each of the aforementioned hand-held scanners utilizes a trigger which, when manually actuated, initiates scanning and reading of the indicia. It has recently been proposed to provide a so-called "triggerless" hand-held laser scanner where, instead of a manually-operated trigger, the scanner employs an extra infrared light emitting diode (LED) and complementary infrared sensor, both mounted in a front end or nose of the scanner. When the nose is positioned close to a symbol, light from the LED reflects therefrom and is detected by the sensor. Additional control circuitry onboard the scanner turns on the laser and scanning components in response to such detection in order to initiate scanning and reading of the symbol.

The working range of this triggerless scanner is therefore limited by the sensing range of the infrared sensor. A symbol placed beyond the range of the sensor cannot be scanned because the sensor will not turn on the laser and scanning components. Moreover, aside from the additional expense of the infrared LED and sensor, this triggerless sensing technique can be inconvenient to use. To read another symbol, or to read the same symbol again, the scanner must be moved away from the symbol beyond the sensing range (e.g. about 15 cm) and then returned to be again positioned within sensing range. This can require large, tiring hand motions. In addition, the triggerless scanner is subject to many false reading attempts since any object positioned near the nose will turn the scanner on and, of course, this can include objects which bear no symbol.

It is also known in this art to construct a digital signal from an analog signal generated from a photoelectric transformation of light reflected off a symbol during scanning by using signal processing digitizing circuits which either use fixed threshold levels derived directly from the analog signal, or which compare a first derivative of the analog signal to a peak signal that follows the peaks of the analog signal. However, such known digitizing circuits are susceptible to errors due to such factors as high ambient light levels and noise, especially in cases where the reading beam spot is poorly focused, i.e., in long-range reading applications, or in reading very high density symbols.

SUMMARY OF THE INVENTION

Accordingly, the present invention is directed to a signal processing digitizing circuit that addresses limitations and disadvantages of the prior art.

One advantage of the present invention is a digital processing digitizing circuit that resists noise, high ambient light levels, and poor focusing conditions, and still provides a true and faithful digital reconstruction of a symbol being scanned.

To achieve these and other advantages, and in accordance with the purpose of the invention, as embodied and broadly described, a circuit for digitizing an analog electric signal generated from a photoelectronic conversion of light reflected off scanning indicia having spatially-separated, light-reflective portions, comprises first differentiating means for differentiating the analog electric signal to generate a first differentiated signal; means for receiving the first differentiated signal and generating a synchronizing signal corresponding to transitions in the spatially-separated, light-reflective portions of the indicia; means for generating a first digital signal having transitions corresponding to the transitions of the spatially-separated, light-reflective portions of the indicia; and output means for receiving the synchronizing signal and the digital signal to produce a digital output signal having transitions corresponding to the transitions of the spatially-separated, light-reflective portions of the scanning indicia.

In another aspect, a method for digitizing an analog electric signal generated from a photoelectronic conversion of light reflected off from scanning indicia having spatially-separated, light-reflective portions, the method comprising the steps of differentiating the analog electric signal to generate a first differentiated signal; receiving the first differentiated signal and generating a synchronizing signal corresponding to transitions in the spatially-separated, light-reflective portions of the indicia; generating a first digital signal having transitions corresponding to the transitions of the spatially-separated, light-reflective portions of the indicia; and receiving the synchronizing signal and the digital signal and producing a digital output signal having transitions corresponding to the transitions of the spatially-separated, light-reflective portions of the scanning indicia.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 17b is an electrical schematic diagram of an alternative-embodiment of the digitizing circuit depicted in FIG. 17a.

FIG. 22 is an isometric view of a stand-alone workstation with a removable scanner; and FIG. 23 is a front elevational view of the workstation of FIG. 22.

DETAILED DESCRIPTION OF THE PREFERRED EMBODIMENTS

Figure 1:
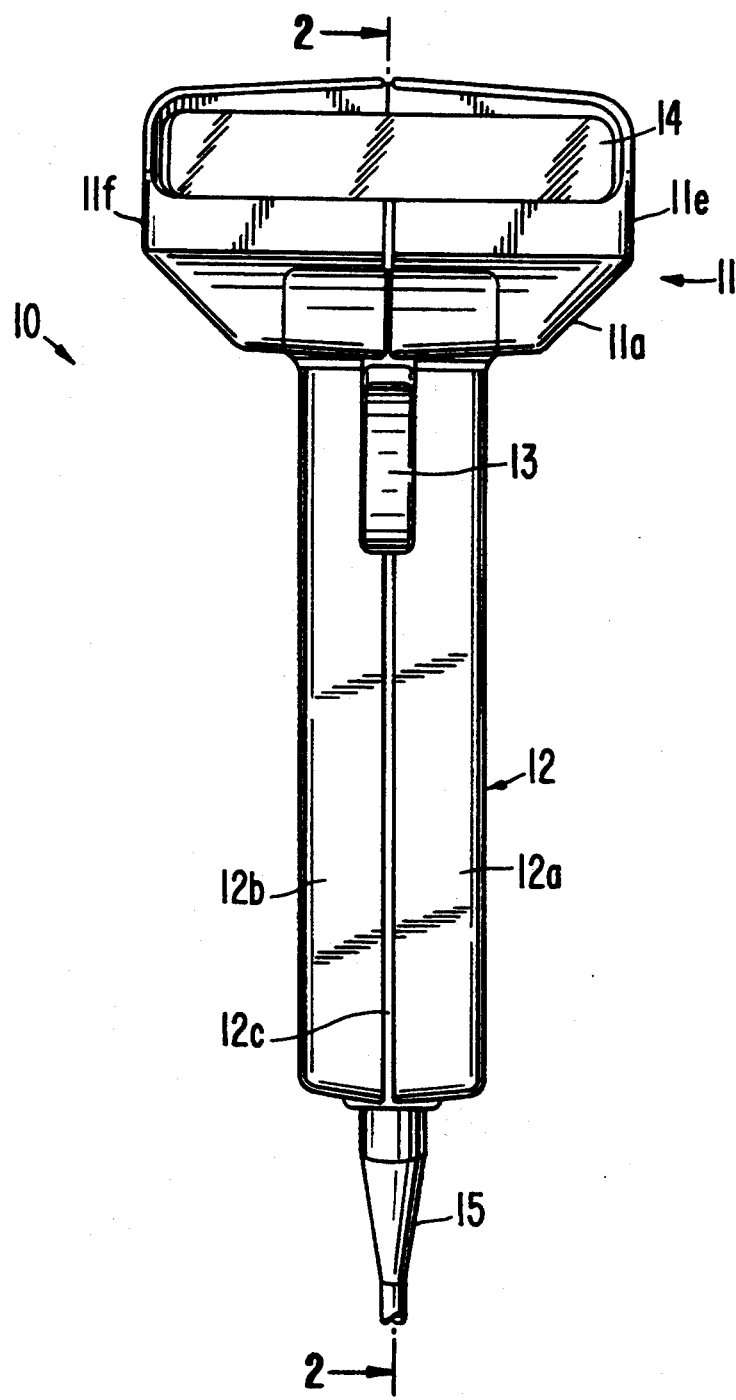
FIG. 1 is a front elevational view of a hand-held scanner.

Referring first to FIGS. 1–4 of the drawings, reference numeral 10 generally identifies a lightweight (less than one pound), hand-held laser scanner supportable entirely by a user for use in a laser scanning system operative for reading, scanning and/or analyzing coded indicia, and aimable both prior to, and during, the reading thereof, by the user at the indicia, each in its turn. The term "indicia" or "symbol", as used interchangeably herein, is intended to cover indicia composed of different portions having different light-reflective properties at the wavelength of the light source, e.g. a laser, being utilized. The indicia may be the omnipresent Universal Product Code (UPC) bar code symbol, or any of the black and white industrial symbols, e.g. Code 39, Codabar, Interleaved 2 of 5, etc. The indicia may also be any alphabetic and/or numeric characters. The term "symbol" is also intended to cover indicia located in a background field, wherein the indicia, or at least a portion thereof, have a different light-reflectivity property than that for the background field. In this latter definition, the "reading" of the symbol is of particular benefit in the fields of robotics and object recognition.

Turning now to FIG. 1, the scanner 10 includes a generally gun-shaped housing having a handle portion 12 of generally rectangular cross-section and generally elongated along a handle axis, and a generally horizontally-elongated barrel or body portion 11. The cross-sectional dimension and overall size of the handle portion 12 is such that the scanner conveniently can fit and be held in a user's hand. The body and handle portions are constituted of a lightweight, resilient, shock-resistant, self-supporting material, such as a synthetic plastic material. The plastic housing preferably is injection-molded, but can be vacuum-formed or blow-molded to form a thin, hollow shell which bounds an interior space whose volume measures less than a value on the order of 50 cubic inches and, in some applications, the volume is on the order of 25 cubic inches or less. Such specific values are not intended to be self-limiting, but to provide a general approximation of the overall maximum size and volume of the housing. The shell is formed of two housing parts 12a, 12b, meeting along a generally vertical joining line 12c.

Figure 4:
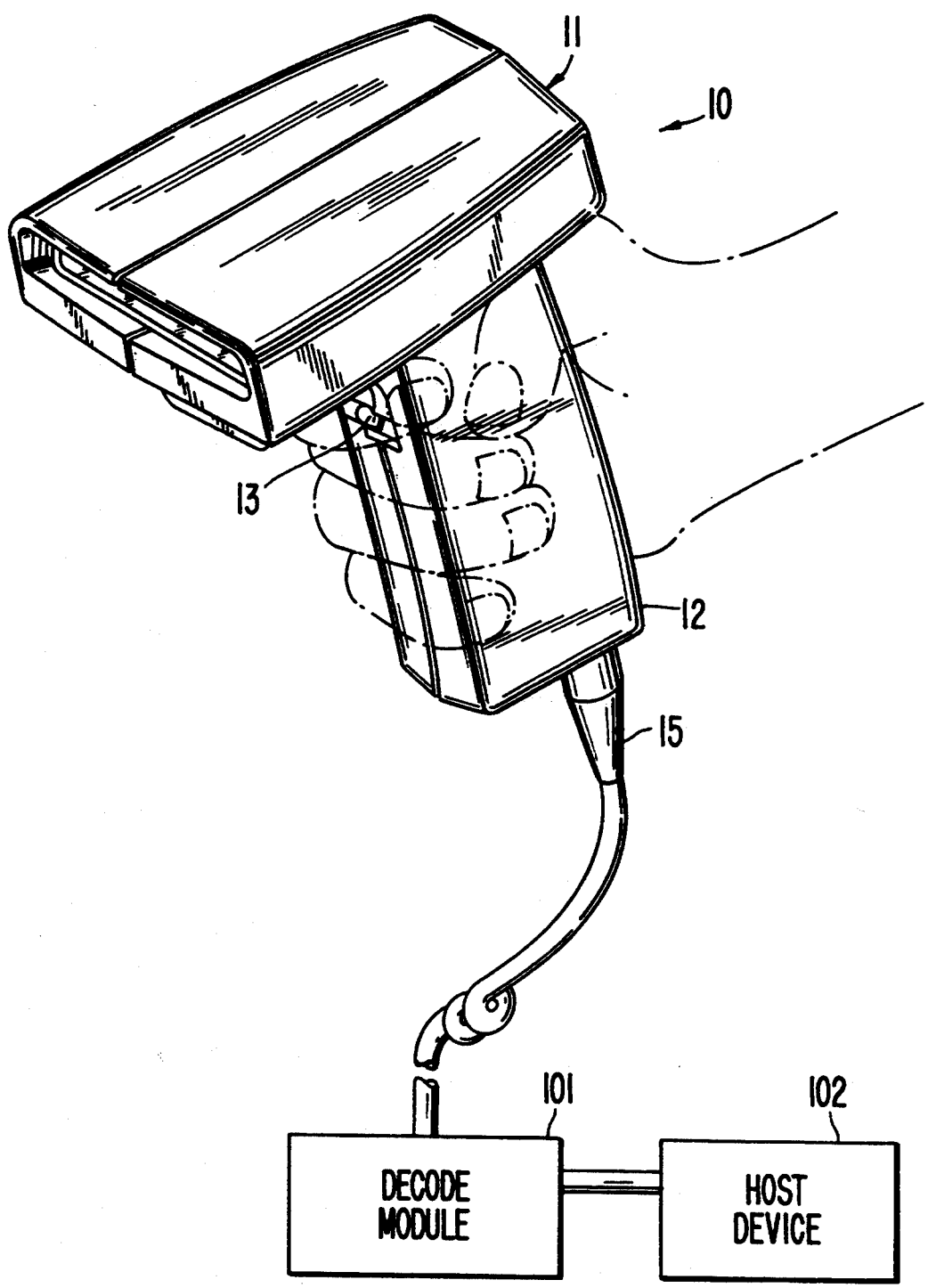
FIG. 4 is a perspective view of the scanner of FIG. 1 in one intended position of use.

As considered in one intended position of use, i.e. as a hand-held scanner as shown in FIG. 4, the body portion 11 has a front prow region or nose having an inclined front wall 11a. The body portion 11 also has a rear region or stern having a rear wall 11b spaced rearwardly of the inclined front wall 11a. The body portion 11 also has a top wall 11c, a bottom wall 11d below the top wall 11c, and a pair of opposed side walls 11e, 11f between the top and bottom walls. The front wall 11a is sloped relative to the top and bottom walls.

A manually-actuatable, and preferably depressible, trigger 13 is mounted on a cantilever resilient arm 13a for movement relative to the housing in a forwardly-facing region where the handle and body portions meet and where the user's forefinger normally lies when the user grips the handle portion in the intended position of use. The bottom wall 11d has a lower opening, and the handle 12 has a forwardly-facing slot through which the trigger 13 projects and is moved. The arm 13a has one end overlying a trigger switch 25 which is switched from an open to a closed state upon depression of the trigger 13.

An exit window 14 is stationarily mounted at the nose and is light-transmissive to allow laser light to pass from the interior to the exterior of the housing, and vice versa.

A flexible, non-bulky, coil-type electrical cable 15 with multiple freedoms of movement interconnects the scanner to the remainder of the components of the laser scanning system, whose operation is explained in greater detail below.

A plurality of components are mounted in the scanner and, as explained below, at least some of them are actuated by the trigger 13, either directly or indirectly, by means of a control microprocessor. One of the components is an actuatable laser light source (see FIGS. 3, 5 and 6), e.g. a semiconductor laser diode 33, operative, when actuated by the trigger 13, for propagating and generating an incident laser beam whose light is visible or at least marginally visible to the human eye. The emitted laser diode beam is highly divergent; diverges differently in different planes parallel and perpendicular to the longitudinal direction of beam propagation; is non-radially symmetrical, i.e. anamorphic; and has a beam cross-section generally resembling an oval. The diode may be of the continuous wave or pulse type. The diode requires a low voltage (e.g. 12 v DC or less) supplied by a power regulator and a battery (DC) source which may be provided within the scanner, or by a re-chargeable battery pack accessory detachably mounted on the scanner, or by a power conductor in the cable 15 connected to the scanner from an external power supply (e.g. DC source).

Figure 5:
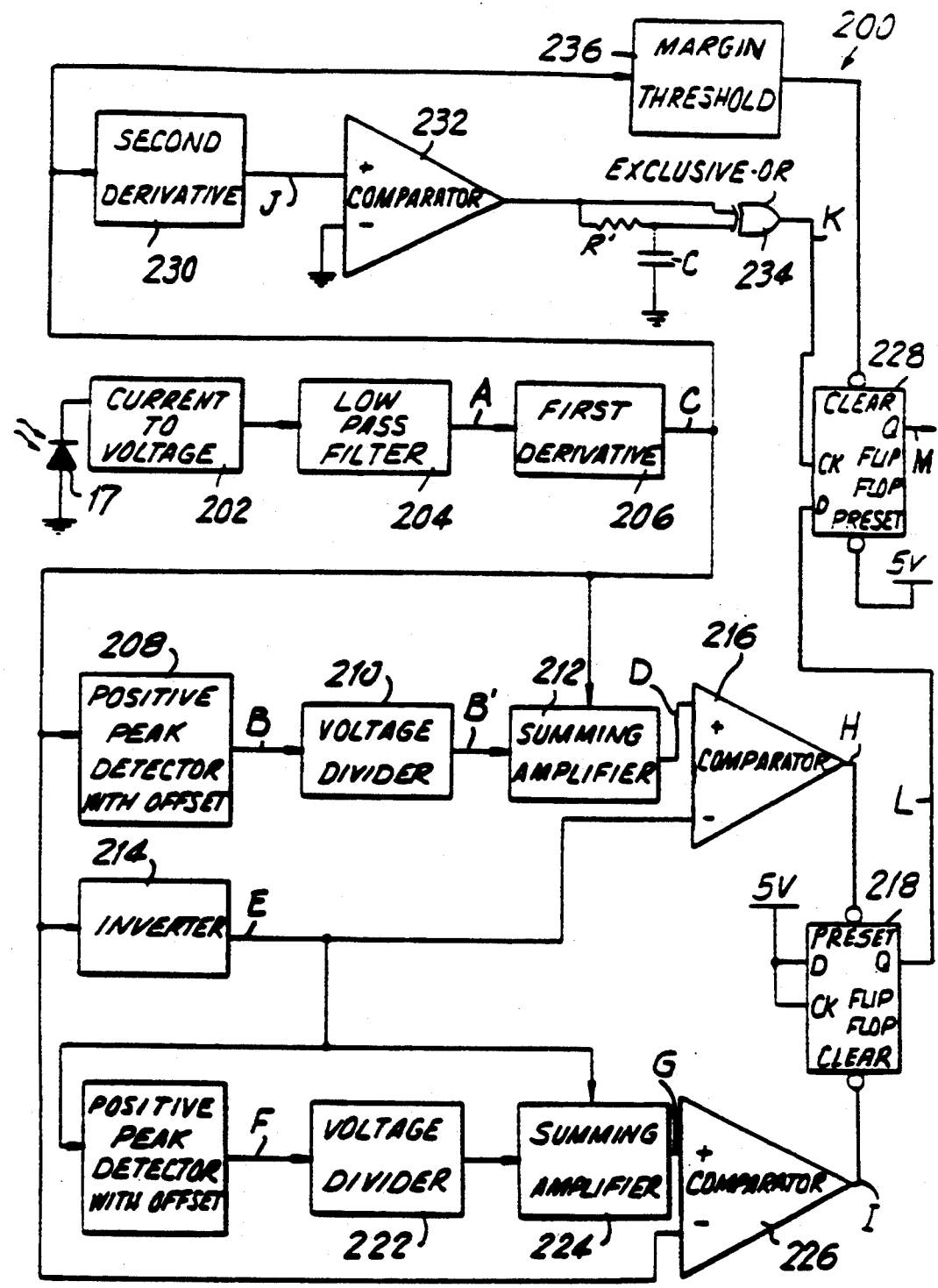
FIG. 5 is a perspective view of an optical assembly used in the scanner of FIG. 1, and shows beam cross-sections in enlarged view.
Figure 6:
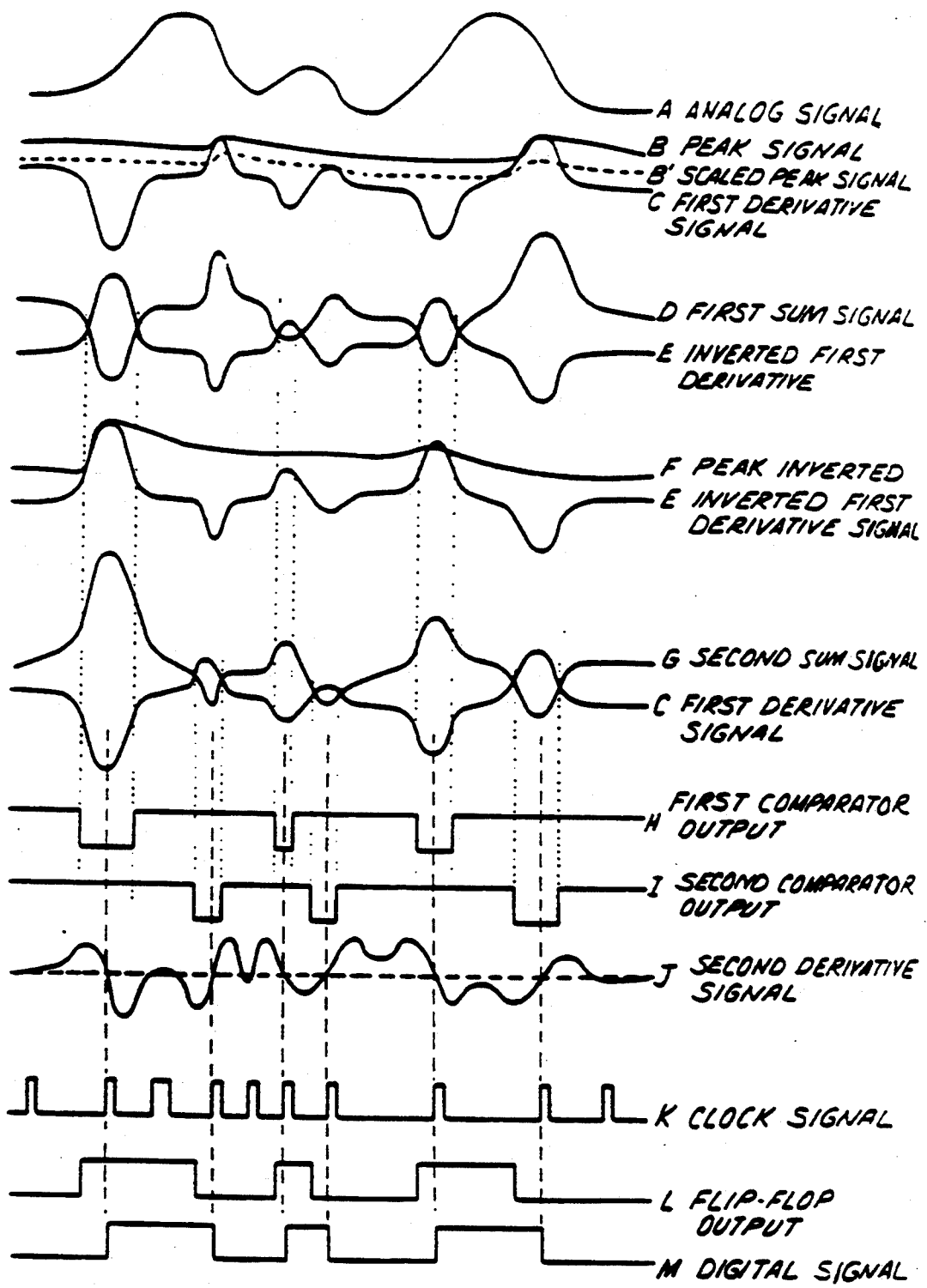
FIG. 6 is an enlarged, sectional view of part of the optical assembly of the scanner of FIG. 1.

As best shown in FIG. 6, an optical assembly 30 is mounted in the scanner on a thin, printed circuit board 16 and adjustably positioned relative to the same for optically modifying, i.e. focusing, and directing the emitted laser beam along a first optical path 21a, 21c toward a reference plane which is located exteriorly of the head, either at the nose for reading symbols in contact with the front wall 11a, or forwardly of the nose for reading symbols out of contact with the front wall 11a. The reference plane lies generally perpendicular to the longitudinal direction along which the emitted laser beam propagates. A symbol 100 (see FIG. 5) to be read is located in the vicinity of the reference plane, either at, or at one side, or at an opposite side, of the reference plane; that is, anywhere within the depth of field of the optically modified laser beam and within a range of working distances as measured relative to the scanner. The laser beam reflects off the symbol as a specular component in one direction and as a scattered component in many directions, and that portion of the scattered laser light which travels along a second optical path 21c and 21b away from the symbol back toward the scanner is known herein as the returning portion.

As best shown in FIG. 6, the optical assembly includes an elongated, cylindrical optical tube 34 having at one end region a cylindrical bore in which an annular casing portion of the diode 33 is snugly received to hold the diode in a fixed position, and at the opposite end region of the optical tube 34 a lens barrel 35 includes an aperture stop 45, blocking wall portions 44 surrounding and bounding the aperture stop, and cylindrical side wall portions 46 which bound an interior space.

The optical assembly further includes a focusing lens 32, e.g. a plano-convex lens, located within the interior space of the side wall portions 46 in the first optical path, and operative, together with the stop, for focusing the emitted laser beam to a beam waist (e.g. see position $d_3$ in FIG. 5) at the reference plane. The aperture stop 45 may be located on either side of the lens 32, but preferably on the downstream side. A biasing means or tensioned coil spring 47 is located within the optical tube, and has one coil end bearing against a casing portion of the diode, and another coil end bearing against a planar side of the lens 32. The spring constantly urges the lens against the blocking wall portions, thereby fixedly locating the lens relative to the aperture stop. The lens and aperture stop are jointly moved when the lens barrel is longitudinally moved.

The aperture stop has a cross-section which is, as explained below, generally about equal to the cross-section of the emitted laser beam at the aperture stop, thereby permitting a major portion of the emitted laser beam to pass through the aperture stop downstream along the first optical path en route to the symbol. The aperture stop cross-section preferably is rectangular or oval, in which case, the longer dimension of the rectangular or oval cross-section is aligned with the larger divergence of the laser beam to transmit more energy to the symbol. The optical assembly includes an optical block 50 having a front portion 52 and a rear portion 54 together bounding an interior in which the diode 33, optical tube 34, lens barrel 35 and the aforementioned components contained therein are received. A heat sink 31 is mounted in intimate thermal contact with the diode to conduct heat away from the same. An elevation adjustment means, including at least one threaded element 56, passes with clearance through aligned holes formed respectively in the heat sink and the rear portion 54, and is threaded into a threaded bore formed in the front portion 52. A hinge 58 is advantageously realized by providing a thin, flexible, weakened zone in the optical block between the front and rear portions thereof. The front portion 52 is stationarily mounted on the board 16 by anchors 59. The diode, tube, barrel and the components contained therein are mounted on the rear portion for movement therewith. Upon turning the element 56 in either circumferential direction about an axis along which the element 56 extends, the rear portion and all the components supported thereon will be angularly moved about the hinge 58 relative to the stationary front portion, thereby raising or lowering the emitted light beam which exits the block 50 through a clearance passage 60 which is dimensioned so as not to block the beam throughout its angular range of adjustment.

The laser beam that passes through the passage 60 is directed rearwardly by the optical assembly along path 21a within the scanner to a generally planar scanning mirror 19b for reflection therefrom. The scanning mirror 19b forwardly reflects the laser beam impinging thereon along path 21c through the forwardly-facing, laser-light-transmissive window 14 and to the symbol. As best shown in FIG. 5, the symbol 100 as shown in the vicinity of the reference plane 102 and, in the case of a bar code symbol, is comprised of a series of vertical bars spaced apart of one another along a longitudinal direction. A laser beam spot is focused on the symbol. When the scanning mirror is, as explained below, reciprocally and repetitively oscillated transversely to sweep the laser beam lengthwise across all the bars of the symbol, a single linear scan is generated. The linear scan can be located anywhere along the height of the bars provided that all the bars are swept. The length of the linear scan is longer than the length of the longest symbol expected to be read and, in a preferred case, the linear scan is on the order of 3 inches at the reference plane.

The scanning mirror 19b is mounted on a scanning means, preferably a high-speed scanner motor 24 of the type shown and described in U.S. Pat. No. 4,387,297, the entire contents of said patent being incorporated herein by reference and made part of the instant application. For the purposes of this application, it is believed to be sufficient to point out that the scanner motor 24 has an output shaft 104 on which a support bracket 19 is fixedly mounted. The scanning mirror is fixedly mounted on the bracket. The motor is driven to reciprocally and repetitively oscillate the shaft in alternate circumferential directions over arc lengths of any desired size, typically less than 360 degrees, and at a rate of speed on the order of a plurality of oscillations per second. In a preferred embodiment, the scanning mirror and the shaft jointly are oscillated so that the scanning mirror repetitively sweeps the laser diode beam impinging thereon through an angular distance or arc length at the reference plane of about 32 degrees and at a rate of about 40 scans or 20 oscillations per second.

Referring again to FIG. 2, the returning portion of the scattered component of the reflected laser light has a variable light intensity, due to the different light-reflective properties of the various parts that comprise the symbol 100, over the symbol during the scan. The returning portion of the reflected laser light is collected by a generally concave, spherical collecting mirror 19a, and is a broad conical stream of light in a conical collecting volume centered on path 21c. The collecting mirror 19a reflects the collected conical light into the head along path 21b through a laser-light-transmissive element 106 to a sensor means, e.g. a photosensor 17. The photosensor 17, preferably a photodiode, detects the variable intensity which extends along, and preferably beyond, the linear scan, and generates an electrical analog signal indicative of the detected variable light intensity.

The collecting mirror 19a is also mounted on the support bracket 19 and, when the scanning mirror is actuated by the trigger, the collecting mirror is reciprocally and repetitively oscillated transversely, sweeping the field of view of the photodiode lengthwise across the symbol in a linear scan.

The scanning mirror and the collecting mirror are, in a preferred embodiment, of one-piece construction, but the scanning mirror can also be a discrete, small, planar mirror attached by glue, or molded in place, at the correct position and angle on a discrete, front surfaced, reflectively coated, concave mirror. The concave collecting mirror serves to collect the returning portion of the laser light and to focus the same on the photodiode.

Also mounted in the head are various electrical subcircuits mounted on board 16. For example, signal processing means 38 on board 16 are operative for processing the analog electrical signal generated by the sensor, and for generating a digitized video signal. Data descriptive of the symbol can be derived from the video signal. Suitable signal processing means for this purpose was described in U.S. Pat. No. 4,251,798. Component 39 on board 16 constitutes drive circuitry for the scanner motor, and suitable motor drive circuitry for this purpose was described in U.S. Pat. No. 4,387,297. Component 40 on board 16 is a voltage converter for energizing the laser diode 33. The entire contents of U.S. Pat. Nos. 4,251,798 and 4,387,297 are incorporated herein by reference and made part of the instant application.

The digitized video signal is conducted, in one embodiment, along cable 15 to decode/control module or means 101 (see FIG. 4) operative for decoding the digitized video signal to a digitized decoded signal from which the desired data descriptive of the symbol is obtained, in accordance with an algorithm contained in a software control program. The decode/control means includes a PROM for holding the control program, a RAM for temporary data storage, and a control microprocessor for controlling the PROM and RAM. The decode/control means determines when a successful decoding of the symbol has been obtained, and also terminates the reading of the symbol upon the determination of the successful decoding thereof. The initiation of the reading is caused by depression of the trigger. The decode/control means also includes control circuitry for controlling the actuation of the actuatable components in the head, as initiated by the trigger, as well as for communicating with the user that the reading has been automatically terminated as, for example, by sending control signals to indicator lamps 36, 37 (see FIG. 3) to illuminate the same.

The decoded signal is conducted to a remote, host computer 103 which serves essentially as a large data base, stores the decoded signal and, in some cases, provides information related to the decoded signal. For example, the host computer can provide retail price information corresponding to the objects identified by their decoded symbols.

In another embodiment, the decode/control means and a local data storage means are mounted on another printed circuit board 27 in the handle portion, and store multiple decoded signals which have been read. The stored signals thereupon can be down-loaded to a remote host computer. By providing the local data storage means, the use of the cable during the reading of the symbols can be eliminated—a feature which is very desirable in making the head as freely manipulatable as possible. A beeper 28 is also optionally mounted on board 27 so that the user can hear through a port 29 in the handle when a symbol has been successfully read. A battery pack is also mounted on the handle portion.

Figure 7:
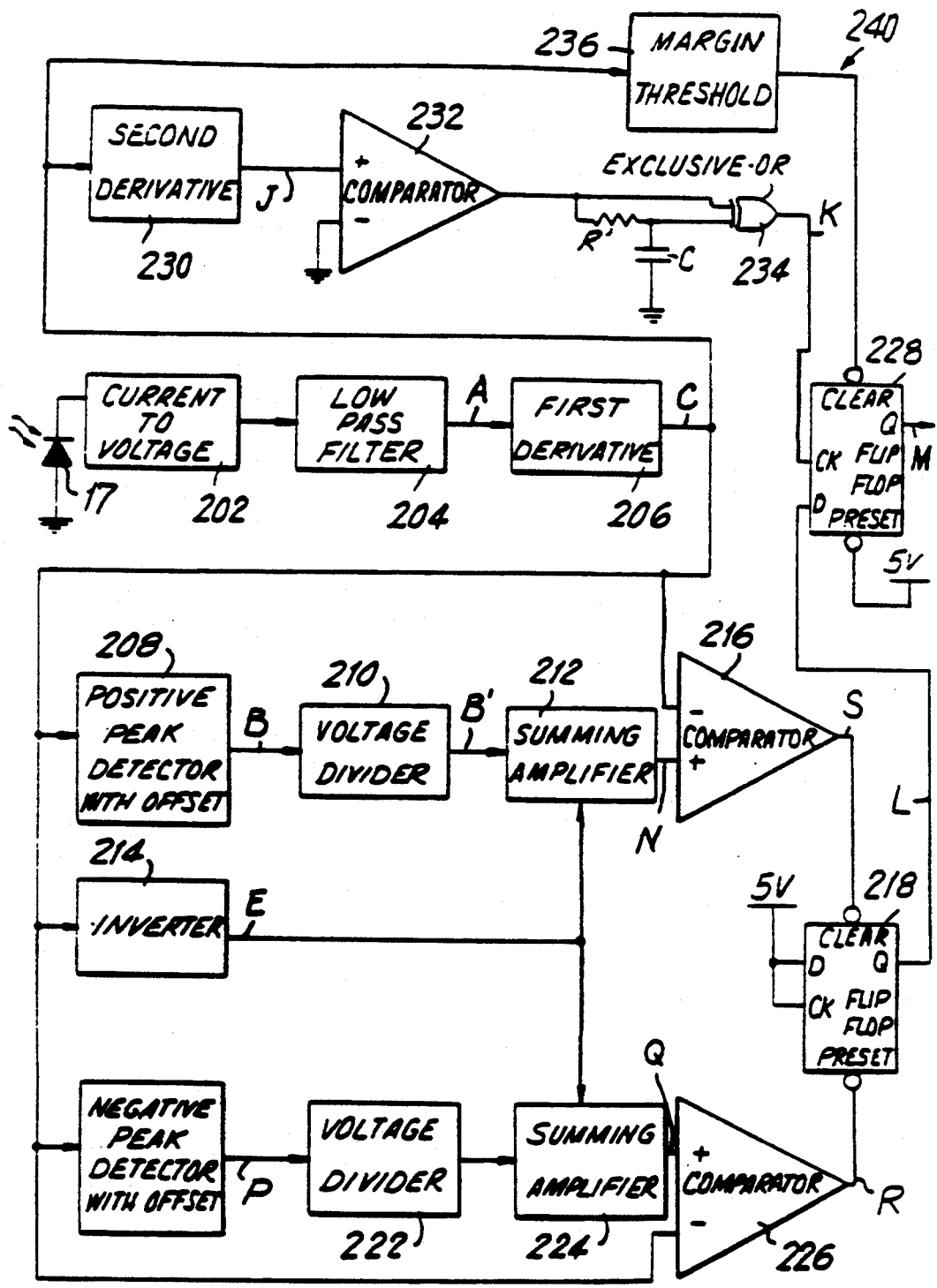
FIG. 7 is a part sectional, part elevational view of the scanner of FIG. 1 in another intended position of use in one embodiment of a stand-alone fixture.
Figure 8:
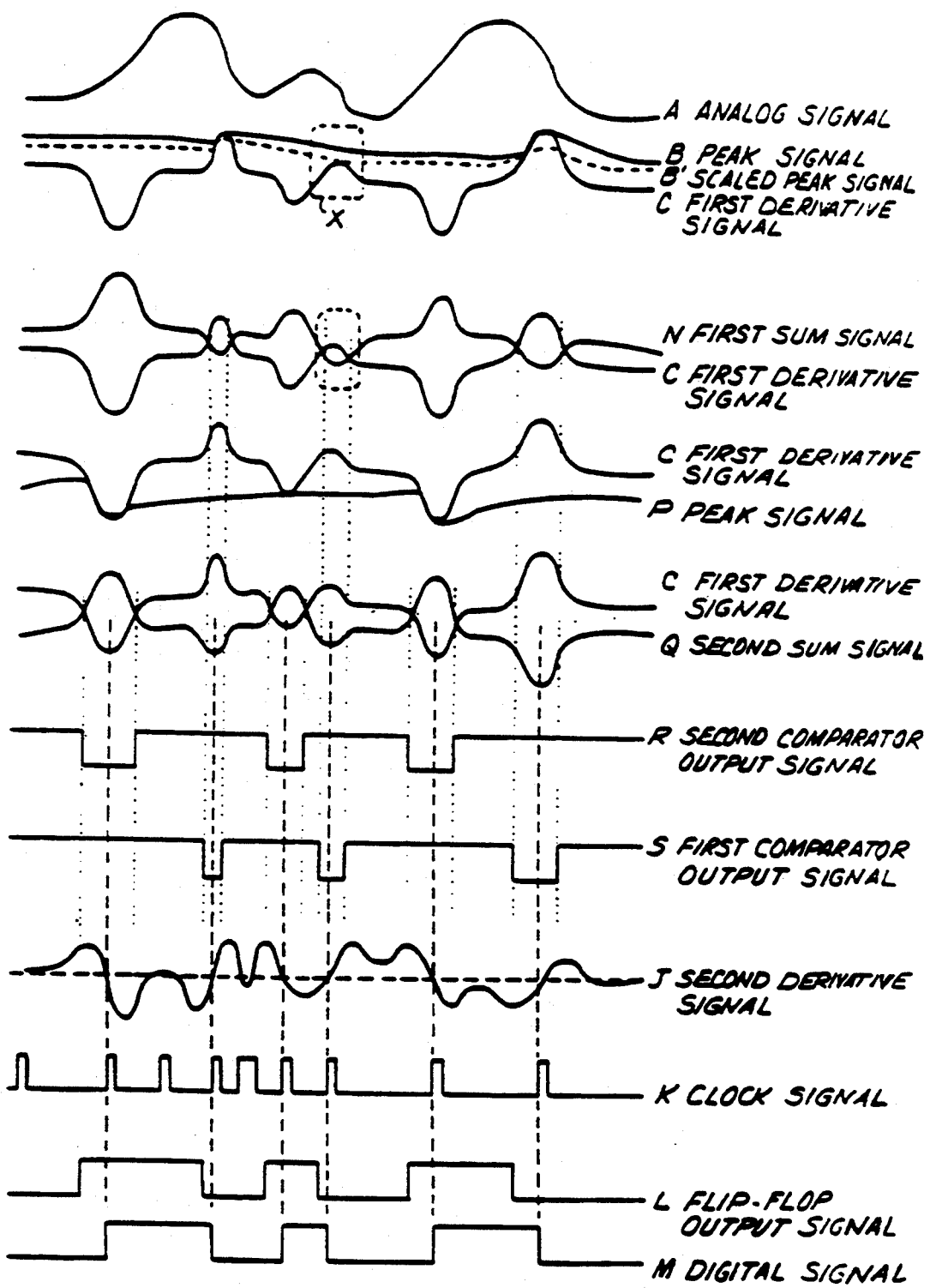
FIG. 8 is a plan sectional view taken on line 8—8 of FIG. 7.

Turning now to FIGS. 7 and 8, the scanner 10, as previously noted, emits a single-line scan pattern. One aspect of this invention is to convert the single-line pattern to a different scan pattern, e.g. an omnidirectional pattern of intersecting scan lines. This is accomplished by the simple expedient of mounting the scanner 10 in a stand-alone, stationary fixture 110.

The fixture 110 has a hollow head 112 elevated relative to a base 114 by an upright 116. Base 114 rests on a horizontal support surface, such as countertop 124. Head 112 has a compartment 118 for receiving the nose of barrel 11 of the scanner 10. Head 112 also has a finger 120 for resiliently engaging with snap action the bottom of handle 12 of the scanner. The scanner is thus snugly held in position on the fixture. A light-transmissive window 122 within the compartment 18 faces the nose and enables the laser beam emitted by the scanner to enter the interior of the head 112.

A scan converter 124 is mounted within the head, and includes a plurality of folding beam mirrors 126, 128, 130 equiangularly arranged about a vertical axis, and stationarily mounted within the head by rear mounts 126a, 128a, 130a. Each mirror is positioned in the path of the emitted laser beam, and is inclined downwardly to face an exit port 132, also constituted as a light-transmissive window.

Once the scanner 10 is supported in the fixture and actuated, as described below, it emits a laser beam which travels linearly between end-limiting positions 134a, 134b (see FIG. 8). During this linear travel, the laser beam sequentially impinges on side mirror 130, central mirror 126 and opposite side mirror 128. Each mirror reflects the impinging beam downwardly through the exit port 132 to a symbol located on or adjacent the base 114 and/or the support surface 124. The use of three mirrors, as shown, generates a set of three intersecting scan lines denoted by reference numerals 126', 128', 130'.

Figure 9A:
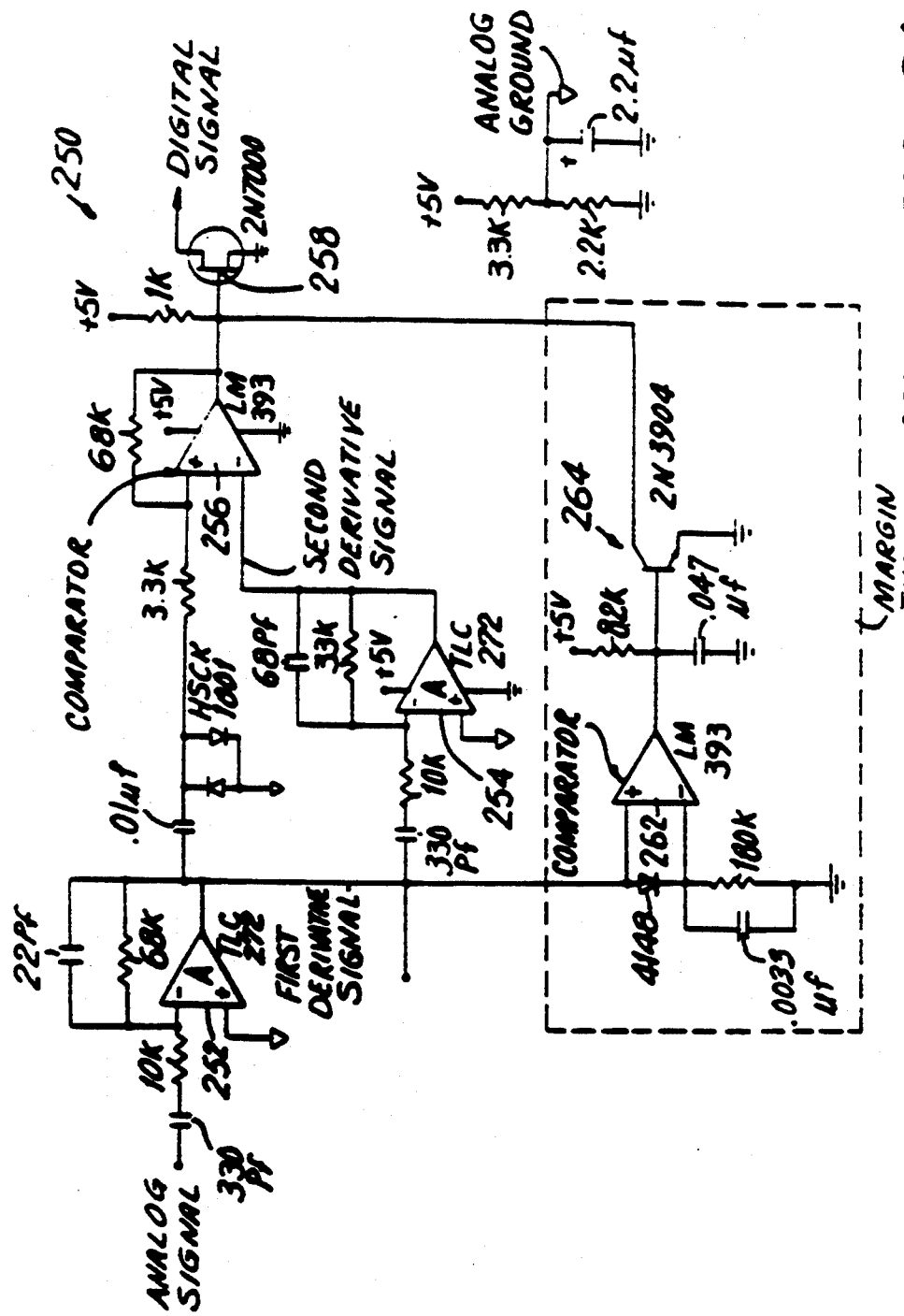
FIG. 9 is a view analogous to FIG. 7 but with another embodiment of a stand-alone fixture.
Figure 9B:
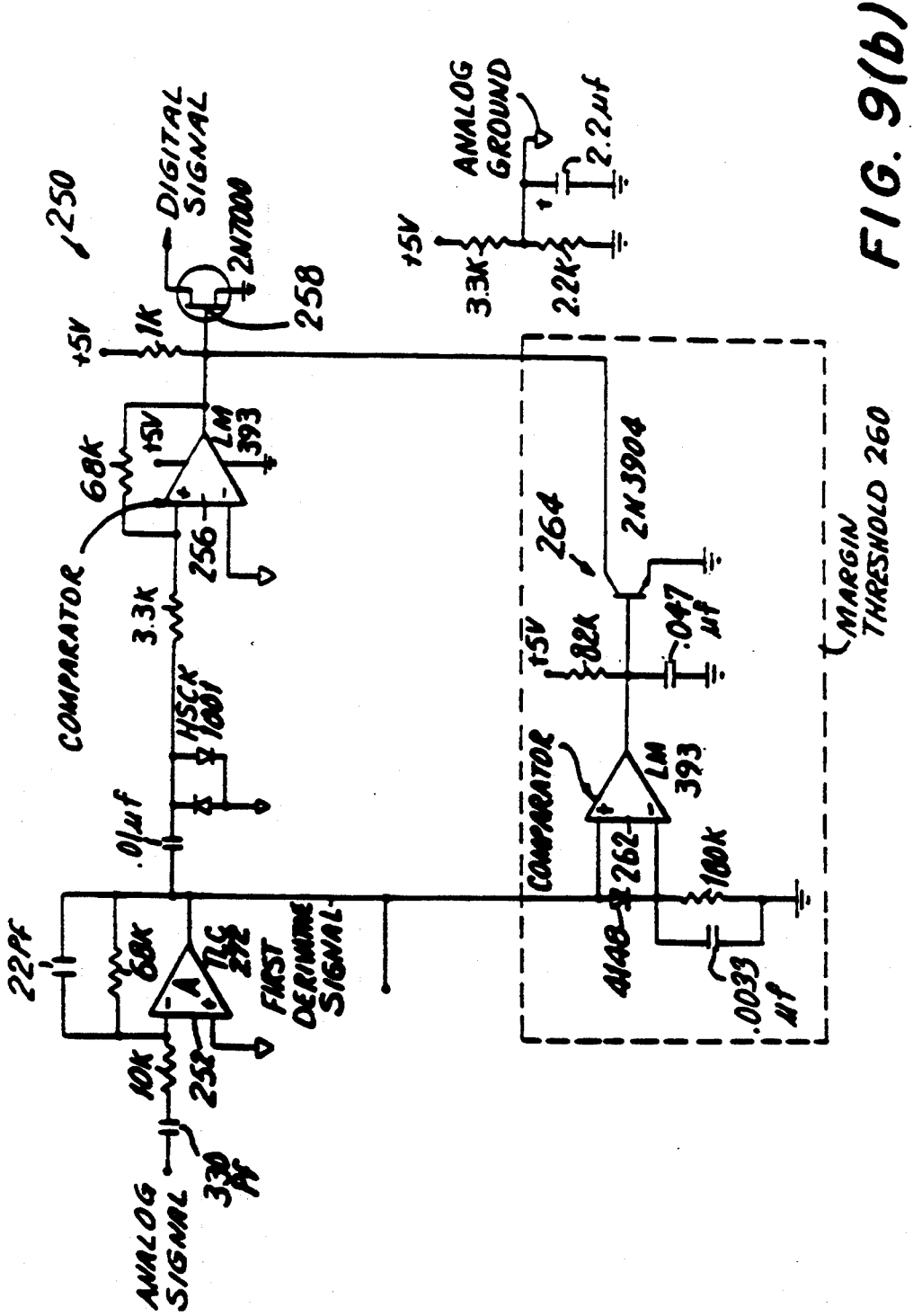
Figure 10:
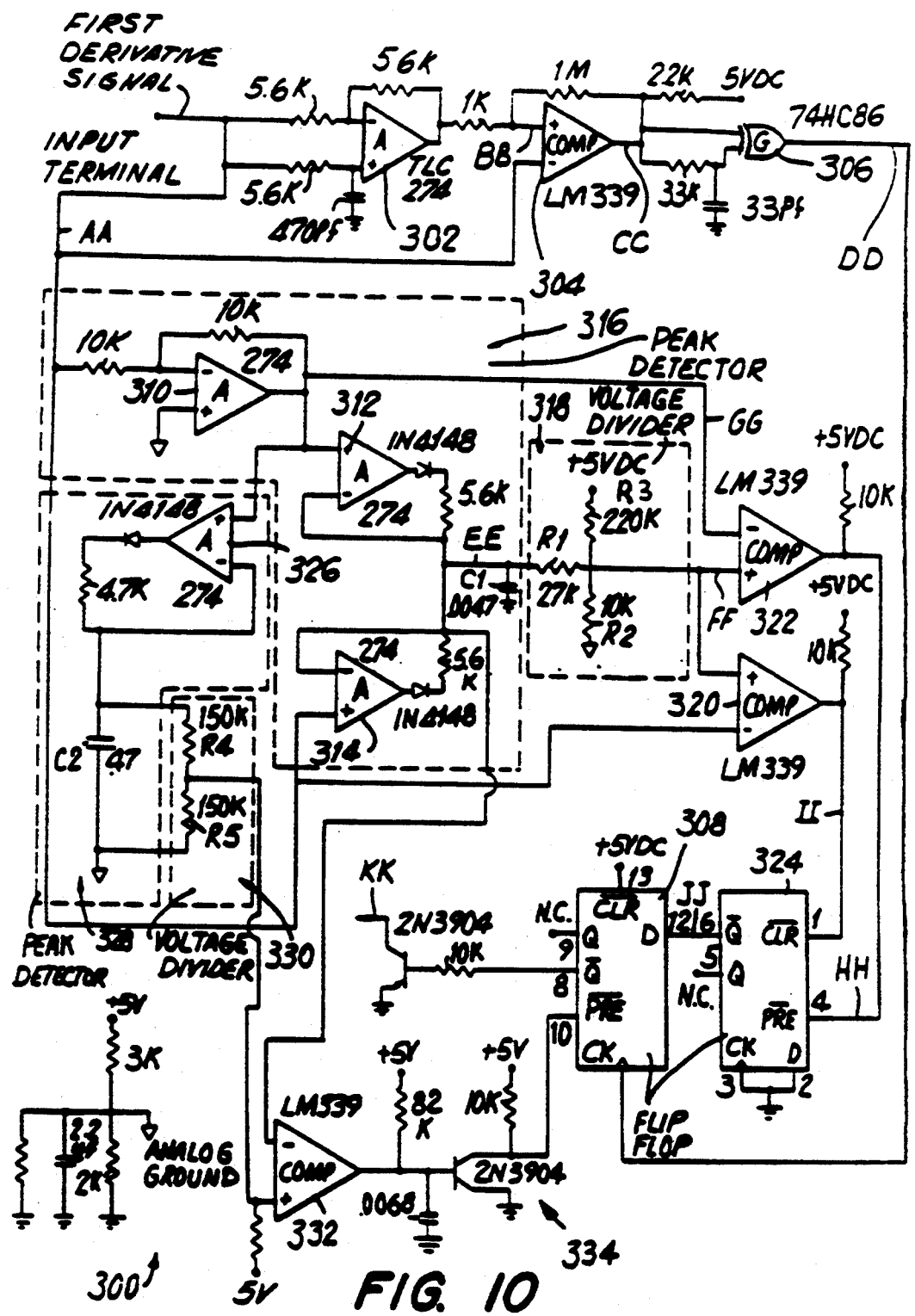
FIG. 10 is a plan sectional view taken on line 10—10 of FIG. 9.

Another scan converter 140 is depicted in FIGS. 9 and 10, and comprises a set of folding beam mirrors 142, 144, 146 equiangularly arranged about a motor shaft 148 on which a main scan mirror 150 is mounted. The shaft 148 is turned by a drive motor 152. Each of the mirrors 142, 144, 146 is stationarily mounted within the head by rear mounts 142a, 144a, 146a and is inclined downwardly to face exit port 132. The main mirror 150 is positioned in the path of the emitted laser beam. A proximity sensor 153 mounted in the fixture is operative to detect the presence of a sensor element 155 mounted in the scanner, thereby detecting the presence of the scanner on the fixture. The locations of the sensor 153 and element 155 could be reversed.

Once the scanner 10 is supported in the fixture and actuated, as described below, it emits a laser beam which impinges on the main mirror 150. Thereupon, as the main mirror 150 is rotated by the motor 152, the beam reflected off the main mirror is sequentially directed to each outer mirror 142, 144, 146 and reflected downwardly through the exit port 132 to a symbol located on or adjacent the base 114 and/or the support surface 124. Again, an intersecting scan line pattern 142', 144', 146' is generated.

Other scan converters are contemplated by this invention, utilizing one or more mirrors, both moving and stationary. For example, a rotating polygon having multiple mirrored facets, or a prism having inclined mirrored faces can be used. The motor 152 is actuated by the proximity sensor 153, 155 when the presence of the scanner on the fixture is detected, and is deactuated when the presence of the scanner is no longer detected by the proximity sensor 153, 155.

As illustrated in FIGS. 7 and 9, when the scanner 10 is mounted on the fixture 110, its trigger 13 is not conveniently operable. Hence, other means of enabling scanning and initiating reading are required.

In one approach, as depicted in FIG. 7, a magnetically actuated reed switch or Hall effect sensor 154 is mounted in the scanner 10, and a magnet 156 is mounted in the fixture. When the scanner 10 is placed on the fixture, the sensor 154 will automatically detect the magnet 156 and cause the scanner 10 to go into a so-called "triggerless" mode, as described below.

Figure 11:
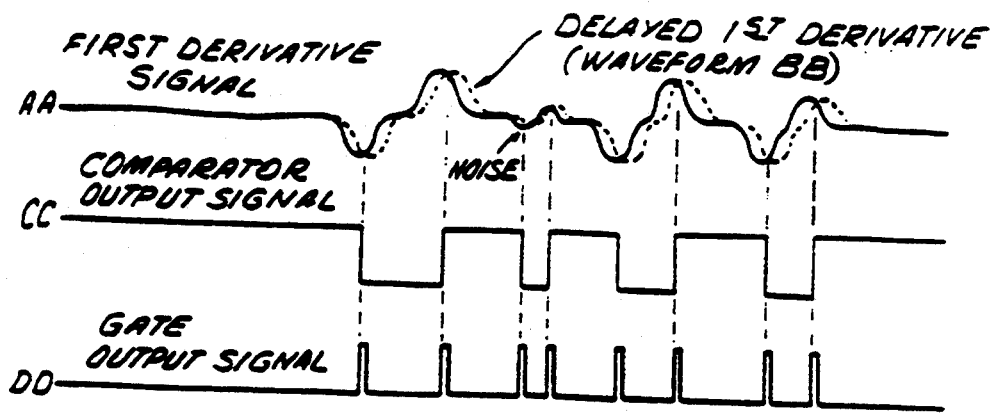
FIG. 11 is a schematic view of a control assembly for use in the scanner/fixture combination of FIG. 7.
Figure 11:
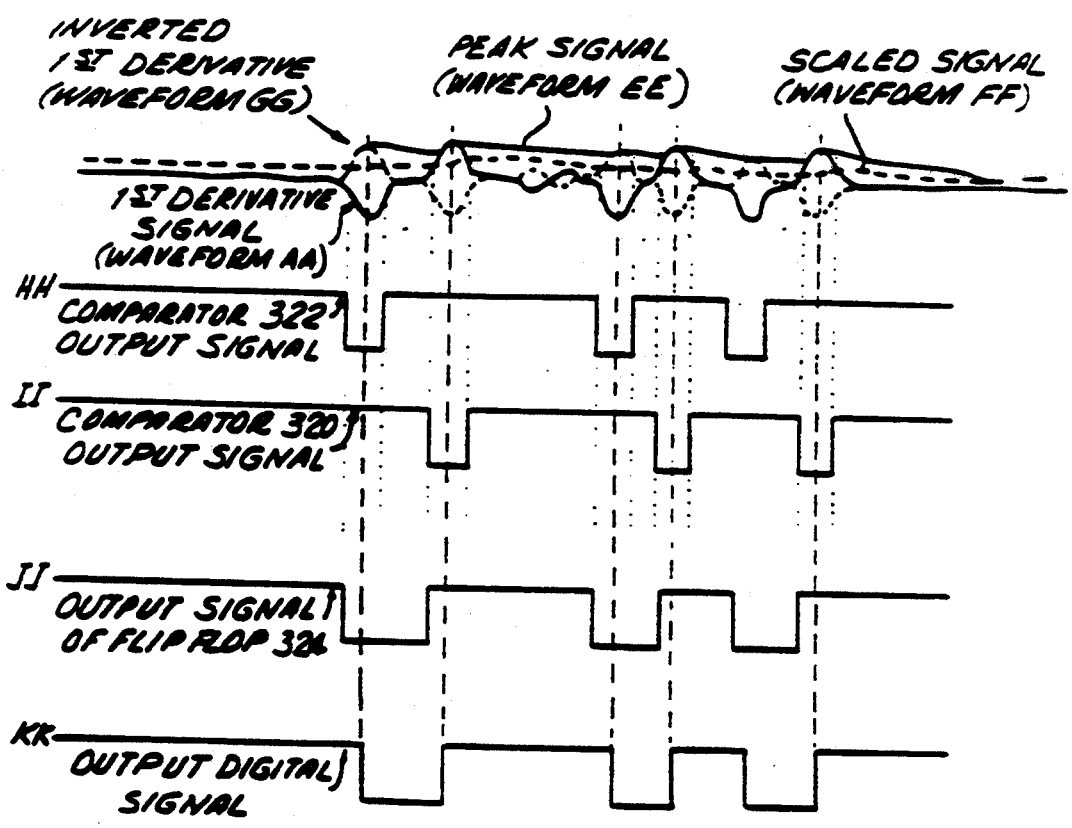

As shown in FIG. 11, a triggerless signal is conducted along conductor 158 in the cable 15 to a microprocessor 160 in the decode/control module 101. The microprocessor is programmed, as described below, to output a control signal along conductor 162 to a laser drive 164 to control the laser diode 33 and/or to output a control signal along conductor 166 to a motor drive 168 to control the scanner motor 24.

In another approach, as depicted in FIG. 9, the fixture has a projection 157 facing the trigger 13. When the scanner 10 is placed on the fixture, the projection 157 will automatically depress the trigger and maintain the trigger depressed for as long as the scanner is on the fixture.

Alternatively, the microprocessor 160 in the decode/control module 101 can be programmed to detect a prolonged trigger pull, for example, greater than 5 seconds, and this will cause the scanner to go into the triggerless mode. The scanner will return to trigger-operated mode when the trigger is released.

In the trigger-operated mode, the scanner 10 will operate normally, as follows: The scanner starts scanning when the trigger is pressed. It scans for a predetermined amount of time, typically 1 or 2 seconds, or until a symbol is decoded, whichever comes first.

The scanner goes into the triggerless mode only when the trigger has been held down for several seconds beyond the predetermined 1 or 2 second period mentioned above. If desired, the scanner can be made such that it can go into the triggerless mode only if the trigger is held down after a special symbol has been read, or only if any symbol has been read, or only if no symbol has been read.

The triggerless mode may be a continuous scanning mode, or it may be a blinking mode in which the scanner "looks" for a symbol a few times a second. The laser diode 33 and/or the scanning motor 24 can be shut off between these looks. If the scanner determines that there is a symbol there, it can stay on until the symbol is decoded, and then return to the blinking mode. This mode can prolong scanner life by minimizing heat build-up in the scanner and minimizing operating time of the motor 24 and/or the laser source 33. In the preferred embodiment, the motor is run continuously and the laser source is placed in the blinking mode.

Rather than mounting a hand-held and hand-operated, triggered scanner in a scan fixture and either manually depressing the trigger to initiate reading in the fixture, or converting the scanner to a triggerless mode while in the fixture, this invention also envisions a new triggerless scanner operable both on and off the scan fixture.

Figure 2:
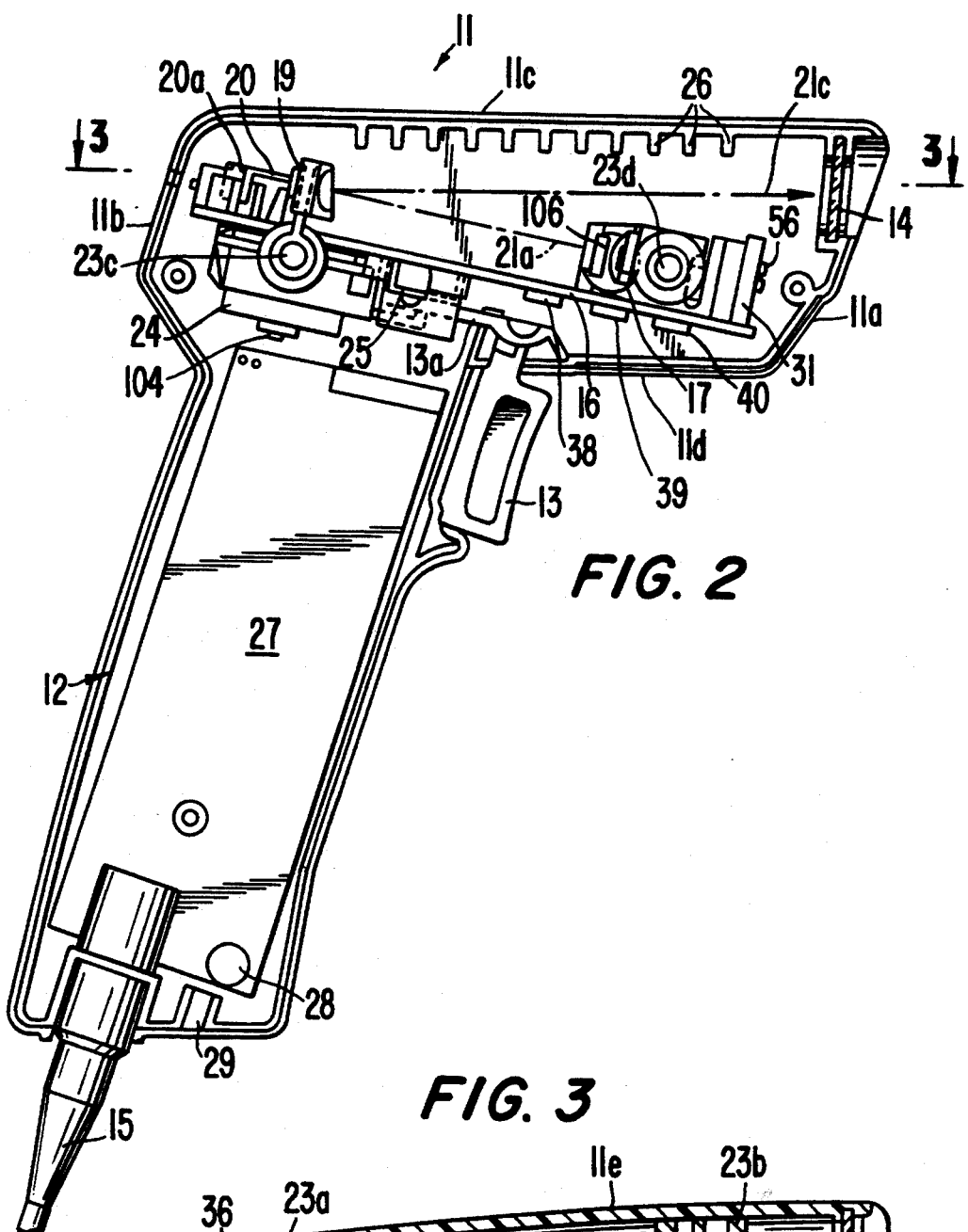
FIG. 2 is a sectional view taken on line 2—2 of FIG. 1.
Figure 12:
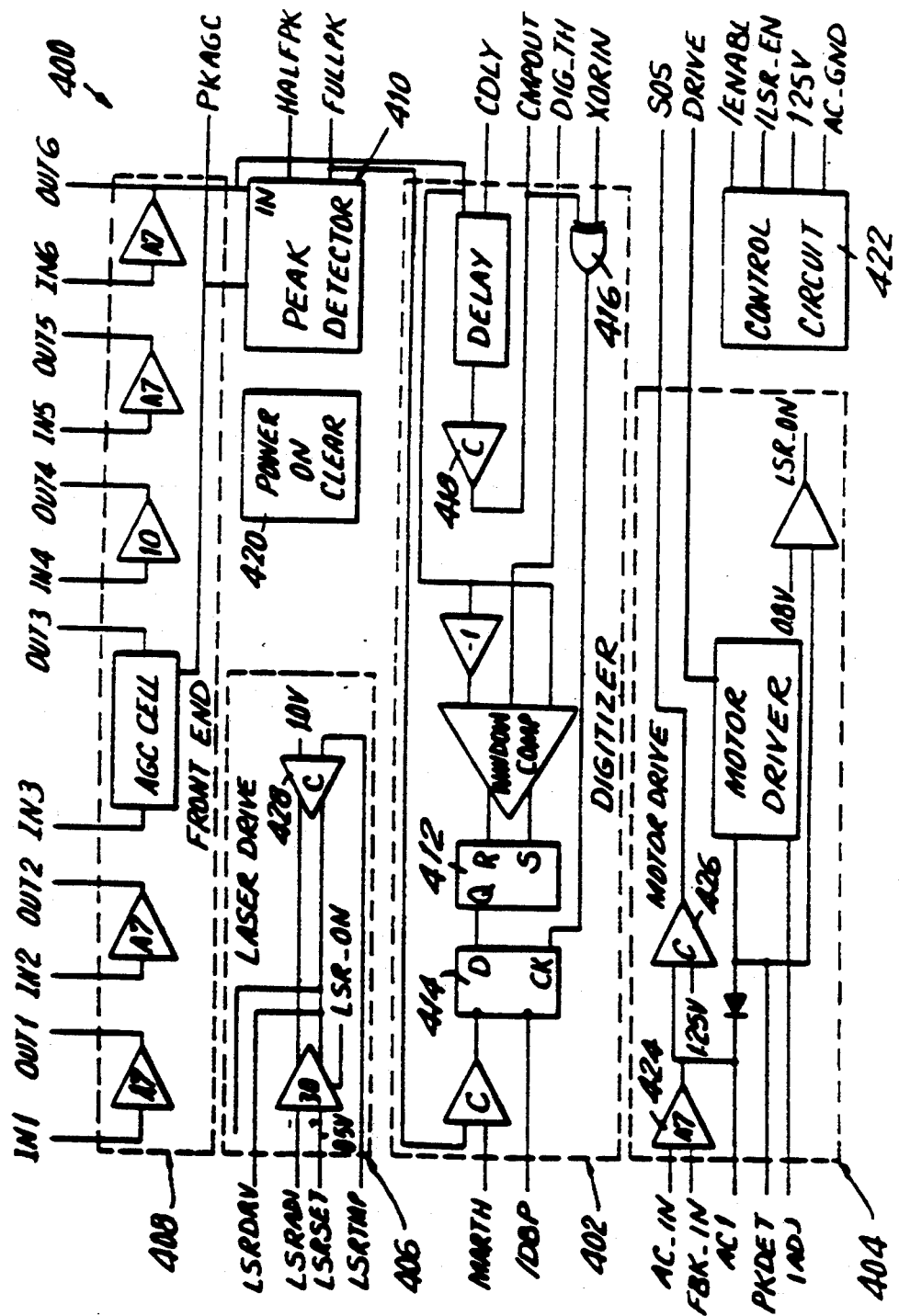
FIG. 12 is a view analogous to FIG. 2, but of a triggerless scanner.

The triggerless scanner shown in FIG. 12 is structurally similar to the scanner shown in FIG. 2, except principally for the lack of a manual pull-type trigger. In the triggerless scanner, working range is limited by designing the optical assembly to focus the laser in an untraditional way.

As shown in FIG. 5, the focusing lens 32 and the aperture stop 45, which comprise the optical assembly, focus the emitted beam to have various cross-sections at distances $d_1$, $d_2$, $d_3$, $d_4$, $d_5$ and $d_6$. As considered along the scan direction, i.e. horizontally across the symbol, the beam cross-section decreases to a minimum at distance $d_3$, and increases to a maximum at distance $d_6$. As considered along the non-scan direction, i.e. vertically, the beam cross-section increases to a maximum at distance $d_3$, and decreases to a minimum at distance $d_6$. The minimum cross-section at distance $d_3$ is termed the beam waist, and is the ideal spot to position the symbol 100 for reading purposes. The symbol could be positioned anywhere in the range of distances $d_1$ through $d_6$, and this constitutes the working range of the scanner.

In all prior laser scanners, the laser is focused so that the beam waist is within the working range, but outside of the scanner housing. The waist size is chosen so as to permit reading of the highest density bar code symbols that the scanner is intended to read, when these symbols are placed at or near the beam waist.

In the triggerless scanner, according to this invention, the beam waist is located within the scanner housing, where a symbol cannot be located. The waist size is significantly smaller than what is needed to read high density symbols. By the time the beam reaches the nose of the scanner, it has grown to a size appropriate for high density symbols. The beam continues to grow very rapidly, due to the very small waist size, until it is too big to read any symbols of common density at only a few inches beyond the nose. For example, a prototype scanner can read 5 mil symbols to about 0.25 inches, 13 mil symbols to about 1.25 inches, and 26 mil symbols to about 2.5 inches. The limited working range avoids the prior art need for large, tiring hand motions to read successive symbols.

This is quite economical as no sensing circuitry is needed, as in the prior art. Laser focusing is also facilitated because the very small waist size means that a low magnification, i.e. less than 10×, focusing system can be used, which is easy to focus.

Since there is no sensor to turn on the laser 33 and scan motor 24 when a symbol is placed near the scanner, it would be desirable to leave the motor and laser running all the time, so that any symbol that comes within scanning range can be immediately decoded. However, this can cause an unacceptable amount of heat to be generated within the scanner housing. The laser, which is the largest heat generator in the scanner, is also the most heat sensitive and shortest-lived component in the scanner. It is therefore important that the laser be turned on only when it is needed. There are several ways laser on-time can be minimized.

The laser can be switched on and off at a high frequency (several times in the time it takes for a beam spot to traverse a bar width). This is a well-known means of reducing laser power consumption. Another way is to turn on the laser only when the decode module 101 is ready to accept new data. This takes advantage of the fact that the microprocessor 160 in the decode module spends part of its time loading data (when the laser is needed) and part of its time evaluating the data that was just loaded (when the laser is not needed). The evaluating (or processing) time can account for from 15% to 50% of a scan time, depending on the symbol being scanned.

Another way to reduce laser on-time is to turn it off during the overscan period. Overscan is the time when the motor angle is such that the laser beam is directed past one end or the other of the scan window, so that it would hit the inside of the housing, not the symbol. The microprocessor 160 can control this by turning off the laser for a short time on either side of a start of scan transition. Start of scan is a signal from the motor drive circuit that indicates that the scan motor direction is changing, to begin a new scan.

After a decode, or if no symbol has been detected for a period of time, the laser can be turned on only occasionally, for example, every other scan, until a symbol is detected. If the decode microprocessor thinks there may be a decodable symbol within range, it can turn on the laser every scan, or whenever it is ready to load scan data until the symbol is decoded, at which time, it will return to the mode of turning on the laser only occasionally.

If the decoder thinks there is a symbol present, causing it to go into the "every scan" mode, but it fails to decode after a predetermined amount of time (for example, two seconds), it will go back to the occasional scan mode until it thinks something new has been presented.

If no new symbols have been decoded after a predetermined amount of time, the duty cycle of the occasional scan mode can be decreased, in several steps if desired. The laser can be blinked every other scan. If nothing is decoded for five minutes, the laser will be on only every third scan. After 15 minutes, it can be every fifth scan. This will minimize laser on-time in environments where the scanner is only occasionally used, or if people leave it powered up when they go home at night, but aggressiveness, which will degrade at low duty cycles, will be maintained in heavy use environments.

If desired, the exact duty cycles and times at which they are enabled can be programmed by the user by bar code menu, or over a scanner-to-host interface.

The laser on-time limiting techniques mentioned above are best implemented if the scan motor 24 runs continuously. Therefore, it is important to have a very long-lived motor, as it may have to run continuously for years. It is also important for the motor to use a minimum amount of power so that it does not heat the interior of the scanner which would shorten the laser's life. A resonant motor is ideal for this, and one such motor was described in pending U.S. pat. application Ser. No. 812,938, filed Dec. 24, 1991.

Another way to limit the working range uses a laser that is focused to provide a working range that is longer than would usually be convenient for a triggerless scanner. Range, in this case, is limited by decode software. The decoder can be programmed to reject symbols that look too small (symbols further away look smaller to the decoder because the spot speed is higher). The working range will now be under software control, which means that it can be varied to suit the particular application. For example, it can be set to six inches for scan fixture operation, or for one inch for reading menus. It can even read different symbologies or specially encoded symbols at different distances.

The signal processing means 38 is, as previously noted, operative for digitizing the analog electric signal generated by the photosensor 17. This analog signal, however, does not have well-defined points indicative of each transition from a bar to a space, or vice versa, of a bar code symbol. The analog signal is characterized by gradually rising slopes which reach an amplitude peak and, thereupon, by gradually falling slopes which drop off from each peak. In such prior art signal processing circuits as described, for example, in U.S. Pat. No. 4,251,798, the analog signal itself was directly used to obtain maximum and minimum fixed threshold levels from which symbol transitions were determined. However, high ambient light levels adversely affected symbol reconstruction.

It was also proposed in such prior art as disclosed in U.S. Pat. No. 5,061,843 to utilize the first derivative of the analog signal and to utilize a peak detector in converting the analog signal to a digital signal. However, in certain situations where the reading spot was poorly focused, i.e., outside its depth of focus, for example, during long range scanning, it is insufficient to compare the first derivative signal with the peak detected signal. The peaks of the first derivative signal vary in amplitude, and very low amplitude peaks were not detected, thereby leading to errors in symbol reconstruction.

Figure 13:
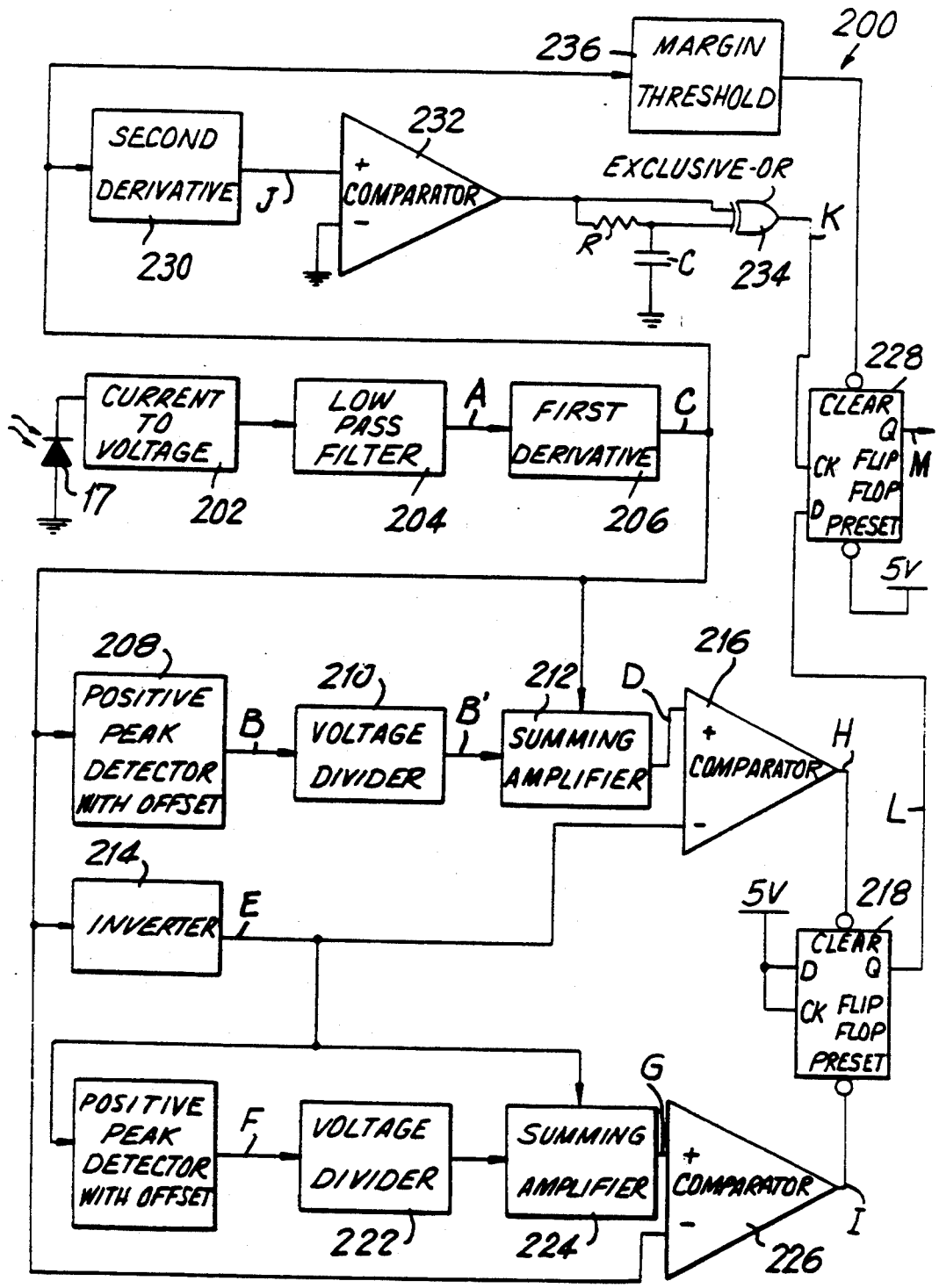
FIG. 13 is a block diagram of one embodiment of a signal processing digitizing circuit in accordance with this invention.
Figure 14:
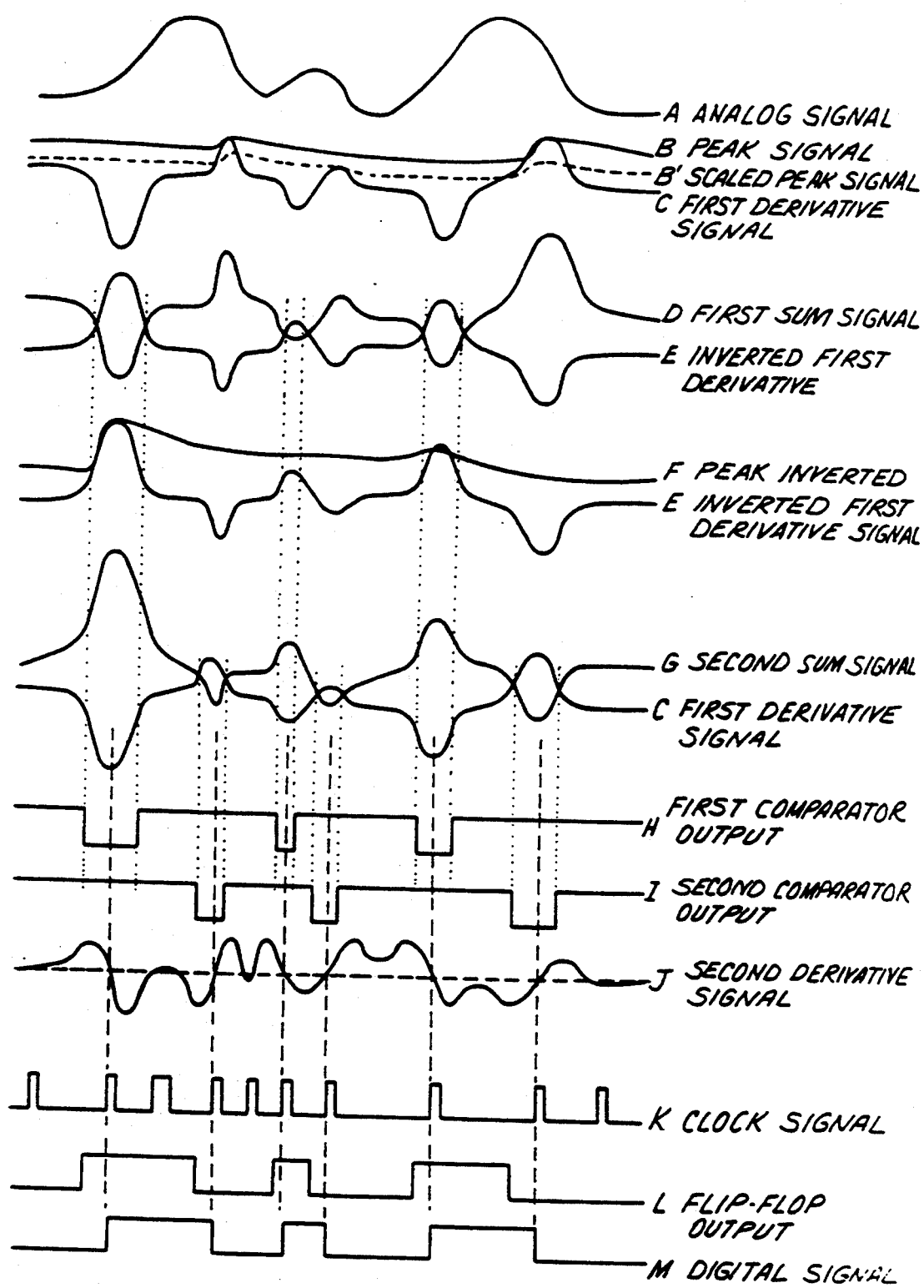
FIG. 14 is a set of waveforms at various locations in the circuit of FIG. 13.

FIG. 13 depicts a signal processing circuit 200, and FIG. 14 depicts voltage waveforms at various locations in circuit 200. Circuit 200 includes a current-to-voltage converter 202 operative for converting the variable electric current generated by photosensor 17 during scanning of a symbol to a voltage. The variable voltage is then filtered by low pass filter 204, thereby resulting in a filtered analog voltage signal (waveform A).

First differentiator 206 generates a first voltage signal (waveform C). The amplitude peaks of the first derivative signal closely approximate the true edge locations of the original bar code symbol. A positive peak detector 208 generates a peak signal (waveform B) that extends from one peak to the next. However, in poorly focused situations, certain peaks of the first derivative signal are very low in amplitude and are not picked up by the peak signal. Hence, as a first corrective measure, the peak signal is scaled down in voltage, typically by 50%, by a voltage divider 210. This scaled-down peak signal is depicted in dashed lines in FIG. 14 as the waveform B'.

A summing amplifier 212 adds the first derivative signal (waveform C) and the scaled-down peak signal (waveform B') to obtain a first sum signal (waveform D). An inverter 214 inverts the first derivative signal (waveform C) to obtain an inverted derivative signal (waveform E). The first sum signal (waveform D) and the inverted derivative signal (waveform E) are then compared in a comparator 216 to obtain a first comparator output signal (waveform H). The comparator output signal is comprised of pulses whose leading and trailing edge transitions are defined each time that waveforms D and E intersect. These transitions are conducted to the "Preset" input terminal of a flip-flop 218, and preset the flip-flop to a binary high logic level "1", thereby indicating positive-going edges.

To obtain the transitions that indicate negative-going edges, the inverted first derivative signal (waveform E) is conducted to another positive peak detector 220 to generate a peak inverted signal (waveform F). As before, a voltage divider 222 scales down the peak inverted signal, and this scaled-down signal is then summed, together with the inverted first derivative signal, in another summing amplifier 224 to generate a second sum signal (waveform G). The second sum signal (waveform G) and the first derivative signal (waveform C) are compared in another comparator 226 to obtain a second comparator output signal (waveform I) which, in turn, is conducted to the "Clear" terminal of the flip-flop 218 to provide the transitions indicative of the negative-going edges that clear the flip-flop 218. The flip-flop 218 generates an output signal (waveform L) which stores a binary high logic level "1" when each positive-going edge is detected, and a binary low logic level "0" when each negative-going edge is detected. This output signal (waveform L) is conducted to the data "D" terminal of another flip-flop 228.

A second differentiator 230 generates a second derivative signal (waveform J) which is fed to one input of a comparator 232 whose other input is grounded. The comparator output is fed through an R-C time delay circuit, and an exclusive OR gate to generate a clock signal (waveform K) in which a pulse is generated every time the second derivative signal (waveform J) passes through zero, i.e., every time the comparator 232 changes from one state to another.

The clock signal (waveform K) is conducted to the clock "Ck" terminal of the flip-flop 228 and, together with the output signal (waveform L) supplied by the flip-flop 218, causes the flop-flop 228 to generate an output digital signal (waveform M). The clock signal is used to clock the flip-flop 228 and to latch the edge direction stored in the flip-flop 218. In this manner, the true bar code edges are reconstructed from the analog signal. A margin threshold subcircuit 236 is used to clear the flip-flop 228, and its operation is described below in connection with FIGS. 17(a) and (b) or FIG. 18.

Figure 15:
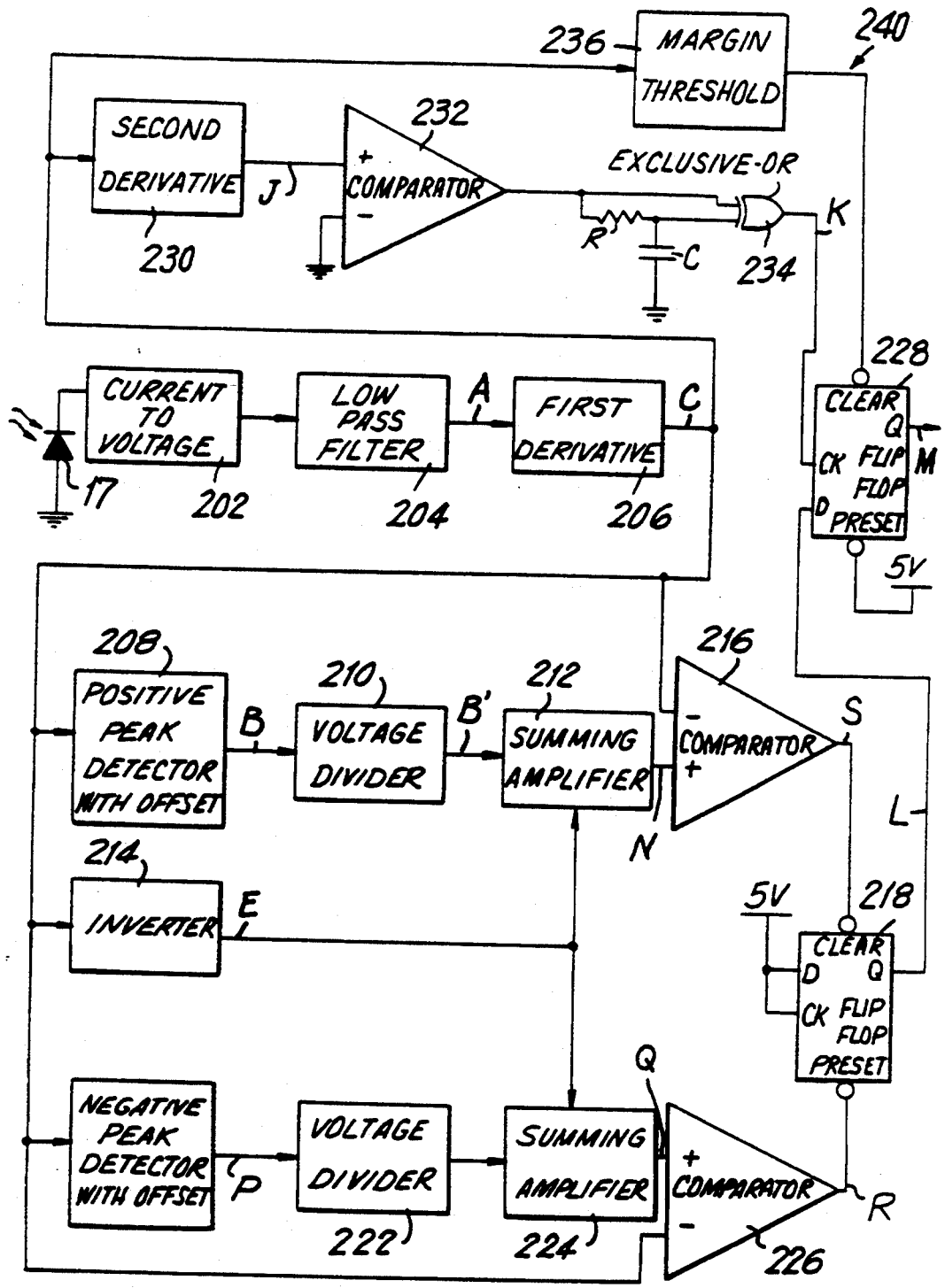
FIG. 15 is a block diagram of another embodiment of a signal processing digitizing circuit in accordance with this invention.
Figure 16:
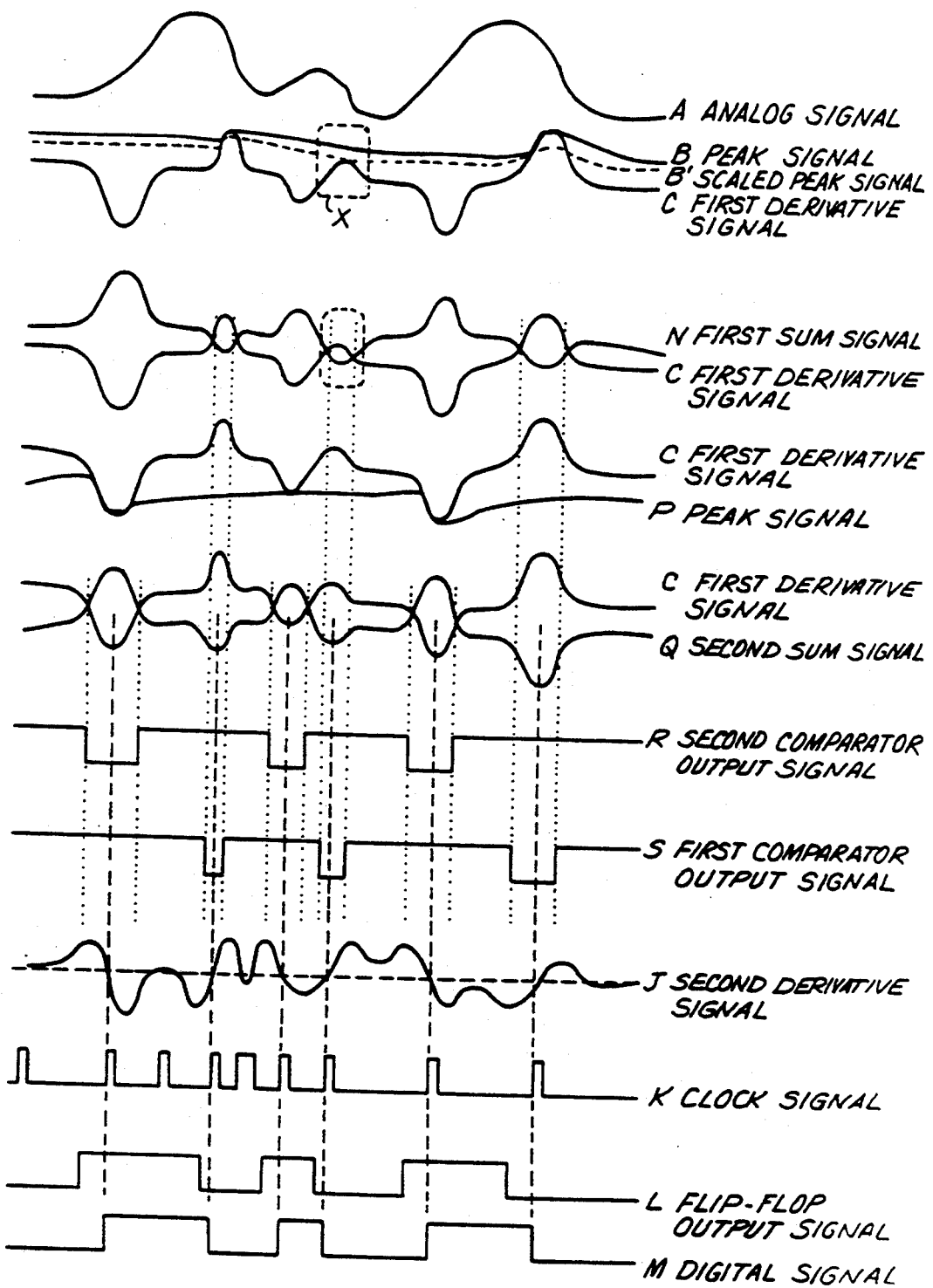
FIG. 16 is a set of waveforms at various locations in the circuit of FIG. 15.

Turning now to FIGS. 15 and 16, another embodiment of a signal processing circuit 240 is depicted together with explanatory waveforms. Like reference numerals identify like components. The converter 202, filter 204, differentiator 206, positive peak detector 208, voltage divider 210, summing amplifier 212 and inverter 214 are operative, as described above, to generate the waveforms A, B, B', C and D In a departure from circuit 200, the summing amplifier 212 generates a first sum signal (waveform N) which is the sum of the scaled-down peak signal (waveform B') and the inverted first derivative signal (waveform E). The comparator 216 compares the first sum signal (waveform N) with the first derivative signal (waveform C) to generate a first comparator output signal (waveform S) which is conducted to the "Clear" terminal of the flip-flop 218. The transitions of the first comparator output signal clear the flip-flop 218 to a binary low logic level "0", thereby indicating each negative-going edge.

To obtain transitions that indicate positive-going edges, a negative peak detector 238 detects the negative peaks of the first derivative signal (waveform C) to generate a negative peak signal (waveform P). A voltage divider 222 scales down the negative peak signal. A summing amplifier 224 sums this scaled-down signal with the inverted first derivative signal to obtain a second sum signal (waveform Q). The second sum signal and the first derivative signal are compared in the comparator 226 to generate a second comparator output signal (waveform R) which is then conducted to the "Preset" terminal of the flip-flop 218. The transitions of the second comparator output signal (waveform R) indicate positive going edges. The flip-flop 218 generates an output signal (waveform L) wherein a binary high logic level "1" is stored by the flip-flop 218 when a positive going edge is detected, and stores a binary low logic level "0" when a negative going edge is detected.

As before, a second differentiator 230 generates a second derivative signal (waveform J) and a clock signal (waveform K) that is fed to the clock "Ck" terminal of the flip-flop 228 whose output digital signal (waveform M) is a digital reconstruction of the symbol.

Hence, rather than using fixed threshold levels derived directly from the analog signal, or comparing the first derivative signal to a peak signal as was done in the prior art, this invention compares the first derivative signal to the sum of the peak signal plus an inverted version of the first derivative signal. Hence, added performance is gained, especially when the contrast levels of the analog signal are low. For example, as shown in the region X in FIG. 16, the contrast level of the analog signal is low. Sometimes the peak signal fails to cross under the peak of the first derivative signal, thereby leading to poor symbol reconstruction.

Figure 17A:
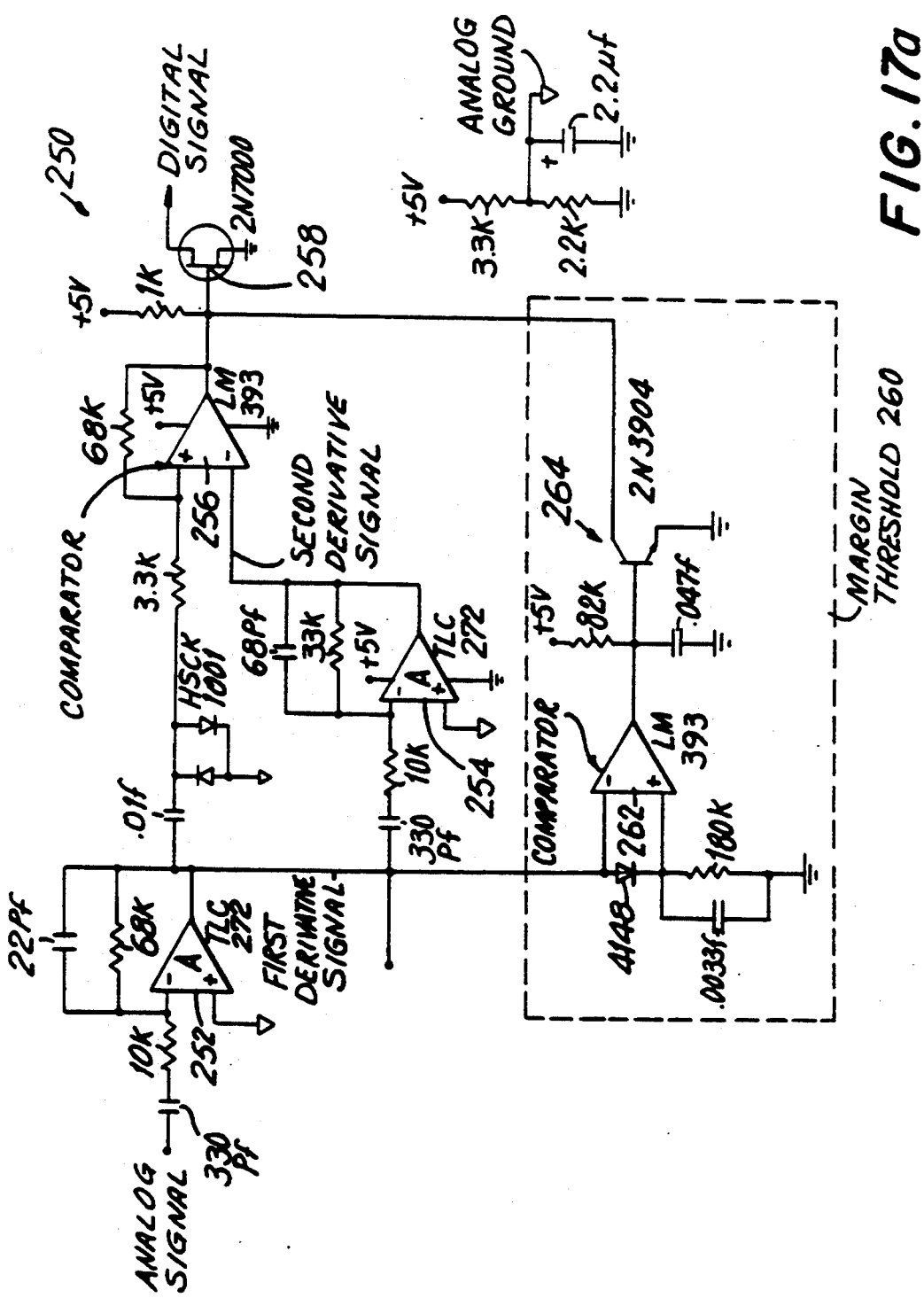
FIG. 17(a) is an electrical schematic diagram of still another embodiment of a signal processing digitizing circuit in accordance with this invention.

A simplified digitizing circuit 250 is depicted in FIGS. 17(a) and (b), and provides good digitizing accuracy even when the reading beam spot is much larger than the narrowest bars or spaces in the symbol being scanned. This makes it particularly good for use in long-range scanners, scanners for reading very high-density symbols, or scanners that are to be used where a large depth of focus is important. The digitizing circuit 250 can also provide excellent immunity to high levels of ambient light, including sunlight.

In FIG. 17(a), the analog signal is initially conducted to a first operational amplifier 252, preferably positioned early in a chain of amplifiers, configured as a differentiator to generate a first derivative signal. A second operational amplifier 254 configured as a differentiator is operative to generate a second derivative signal. A passive differentiator could be used here for simplicity. The first and second derivative signals are conducted to the pair of inputs of a comparator 256 whose digital output is conducted to a transistor 258. A margin threshold subcircuit 260 includes a comparator 262, one input of which is supplied with the first derivative signal, and the other input of which is grounded. The output of comparator 262 is conducted to the base of a transistor 264 whose collector is connected to the output of the comparator 256.

FIG. 17(b) is another embodiment of the digitizing circuit 250 shown in FIG. 17(a). In the digitizing circuit of FIG. 17(b), the inverting input of comparator 256 is tied to an analog ground instead of a second derivative signal as shown in FIG. 17(a). The remaining portions of the embodiment of FIG. 17(b) is identical to the embodiment of FIG. 17(a).

Figure 18:
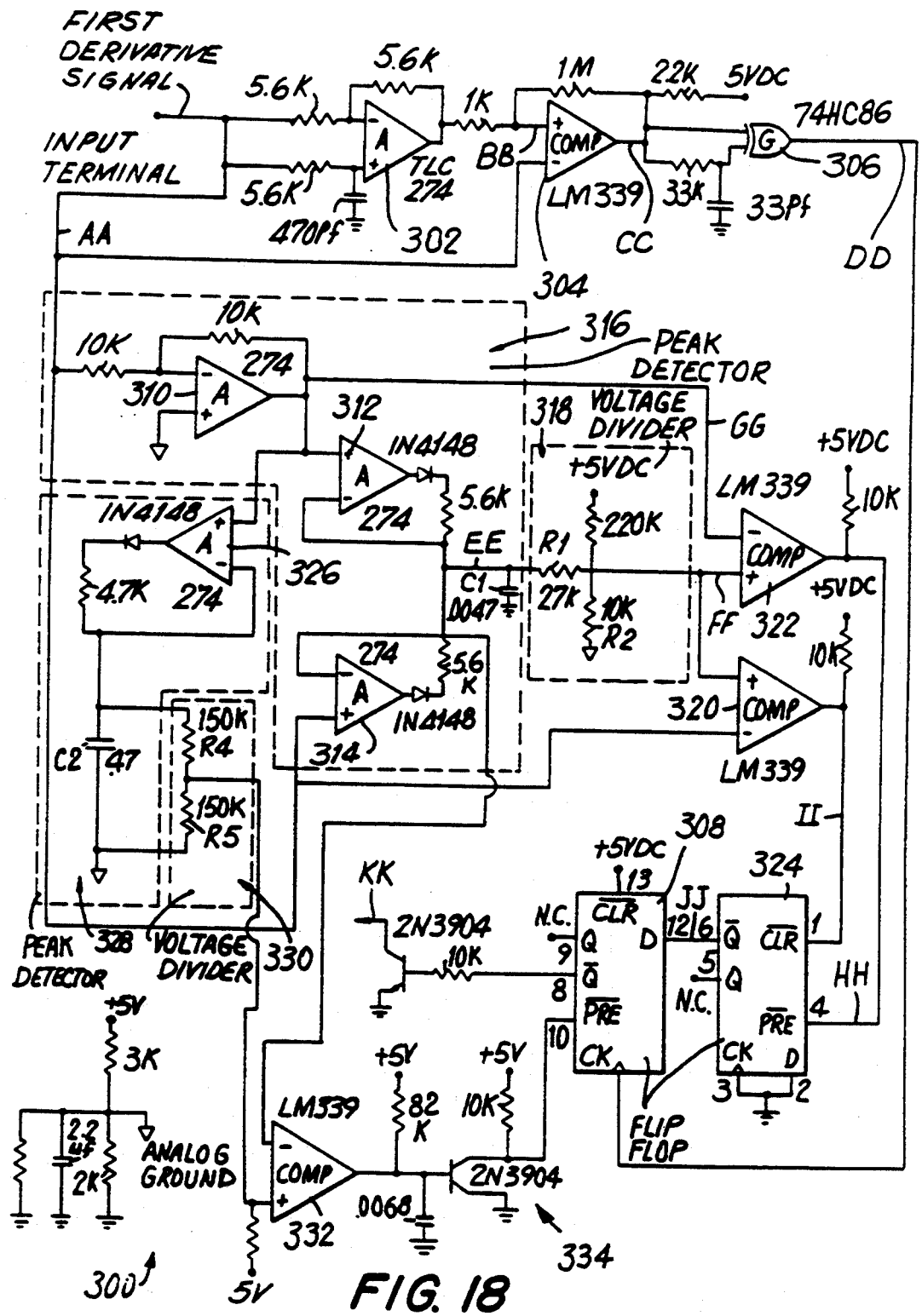
FIG. 18 is an electrical schematic diagram of yet another embodiment of a signal processing digitizing circuit in accordance with this invention.
Figure 19:
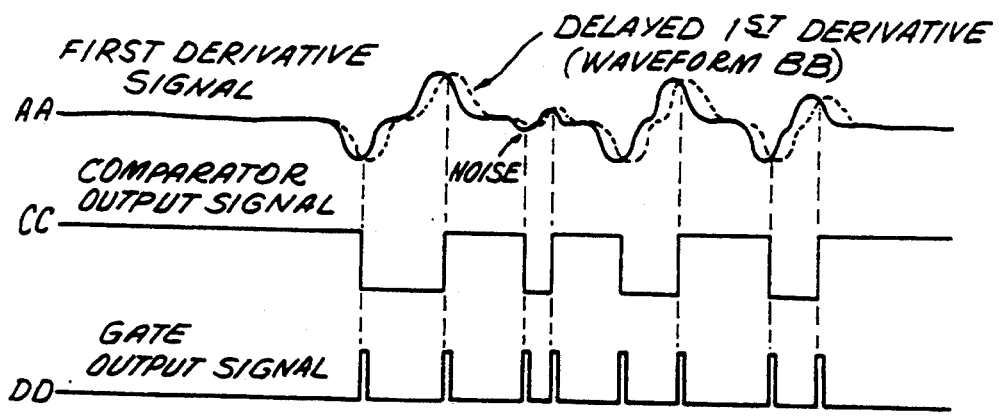
FIG. 19 is a set of waveforms at various locations in the circuit of FIG. 18.
Figure 19:
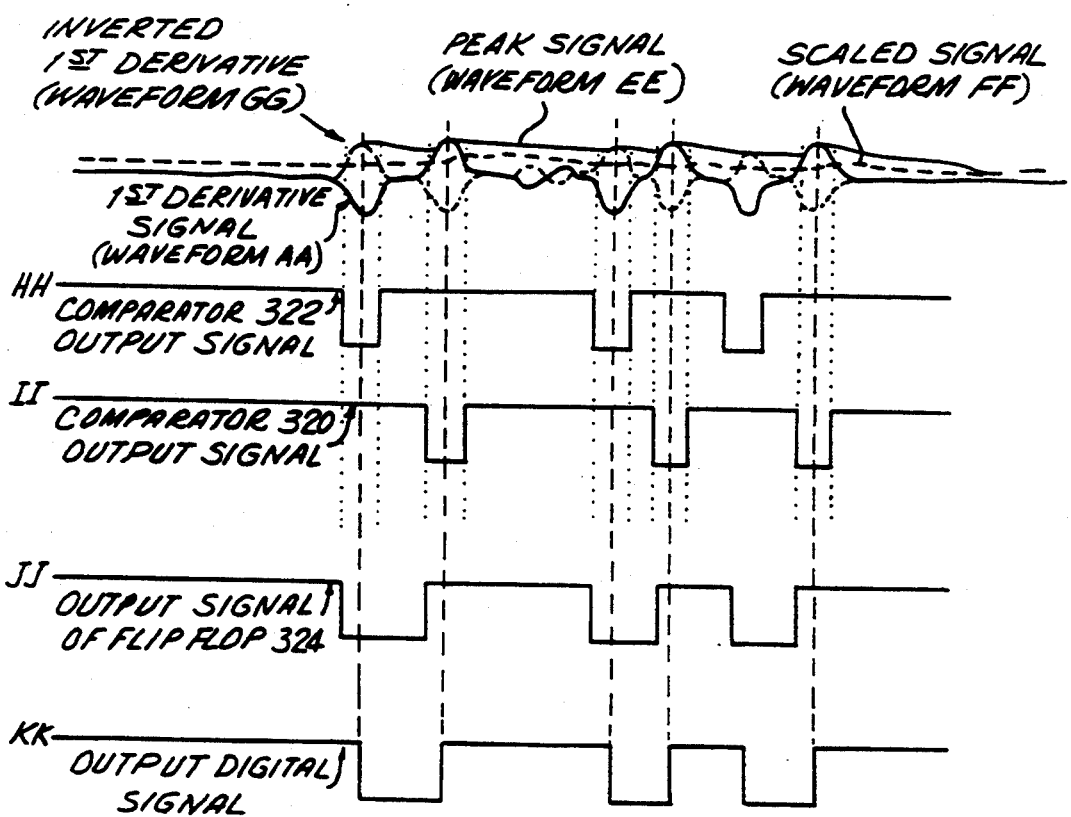

Another signal processing digitizing circuit 300 is set forth in FIG. 18 with explanatory waveforms depicted in FIG. 19.

A non-illustrated differentiator generates a first derivative signal of the analog signal. This first derivative signal (waveform AA) is applied to an input of the circuit 300. The signal polarity is such that negative peaks represent white-to-black transitions, and positive peaks represent black-to-white transitions, of the bar code symbol being scanned with light.

Operational amplifier 302 is operative to slightly delay the first derivative signal. The delayed first derivative signal is depicted in FIG. 19 by dashed lines as waveform BB. A comparator 304 compares the delayed first derivative signal (waveform BB) to the undelayed first derivative signal (waveform AA), and generates a comparator output signal (waveform CC). Gate 306 generates a gate output signal (waveform DD) having a pulse at each rising and each falling transition at the output of comparator 304. The gate output signal (waveform DD) is then conducted to the clock "Ck" terminal of a flip-flop 308.

Operational amplifiers 310, 312, 314 together form a full wave peak detector 316, which causes capacitor C1 to be charged to the absolute value of the peaks of the first derivative signal. Capacitor C1 discharges through resistors R1 and R2. This peak voltage is displayed in FIG. 19 as waveform EE.

The voltage at the node between resistors R1 and R2 is a percentage of the voltage across capacitor C1 and, with the value shown, is about 27%. The resistors R1 and R2 serve as a voltage divider 318. The scaled-down voltage signal is depicted in FIG. 19 as waveform FF.

Comparator 320 compares this scaled-down peak signal (waveform FF) to the first derivative signal (waveform AA). Comparator 322 compares the same scaled-down peak signal (waveform FF) to an inverted version (waveform GG) of the first derivative signal. The inversion is performed by the amplifier 310. The output signal (waveform HH) of comparator 322 is connected to the "Preset" terminal of a flip-flop 324. The output signal (waveform II) of the comparator 320 is connected to the clear "Clr" terminal of the flip-flop 324.

As shown by waveform JJ, which is the output signal of the flip-flop 324, the flip-flop 324 flips to one state whenever positive peaks of the first derivative signal (waveform AA) exceed a percentage of the voltage on capacitor C1, the percentage being determined by the ratio of resistors R1 and R2. Flip-flop 324 flips to the other state when the positive peaks of the inverted first derivative signal (waveform GG) exceed the same percentage of the voltage on capacitor C1. Peaks on the first derivative signal (waveform AA) that do not exceed the percentage voltage are not sensed by the comparator 322 or by the comparator 320, and do not change the state of flip-flop 324. This prevents circuit 300 from responding to noise.

The output of flip-flop 324 is connected to the data "D" terminal of flip-flop 308. This causes the output of flip-flop 308, as shown by its output digital signal (waveform KK) to change state only upon the first pulse into its clock input after flip-flop 324 changes its state. Additional clock pulses, such as those caused by noise, are ignored. The gate output signal (waveform DD) occurs only at peaks of the first derivative signal as described above. Therefore, flip-flop 308 only changes its state when the first peak after the transition of flip-flop 324 occurs. The output digital signal (waveform KK) has transitions that accurately correspond to the peaks of the first derivative signal, except, of course, for the noise peaks which are ignored.

Resistor R3 in the voltage divider 318 prevents the peak detector 316 from discharging all the way to zero when there is no bar code symbol or other graphics being scanned. This keeps circuit 300 from responding to low level noise.

Operational amplifier 326 is used in another peak detector circuit 328, and charges capacitor C2 to the positive peak level of the inverted first derivative signal (waveform GG). These peaks correspond to the white-to-black transitions of the analog signal. Capacitor C2 is slowly discharged through resistors R4 and R5 which are part of another voltage divider 330. The resultant time constant is long enough so that capacitor C2 does not totally discharge between scans. The voltage at the node between resistors R4 and R5 is, with the values shown, one-half of the voltage of capacitor C2.

Another comparator 332 compares the voltage at the node between resistors R4 and R5 with the voltage out of the full wave peak detector. If a symbol is being scanned, the output of the full wave peak detector will be higher than the voltage at the other input of the comparator 332. This will cause the output of the comparator 332 to be low.

Shortly after the scanning spot moves off the last bar of the symbol being scanned, the capacitor C1 discharges until it has less than half of the voltage of capacitor C2. This causes the output of the comparator 332 to go high, thereby turning on a transistor 334. The output of transistor 334 is connected to the preset "PRE" terminal of the flip-flop 308, and presets the flip-flop 308, thereby insuring that the latter is in the proper state for the next scan to start. This also increases the immunity of the circuit 300 to noise between scans, as it prevents the flip-flop 308 from responding to anything that has an amplitude that is less than that existing at the node between the resistors R4 and R5, and serves as a margin threshold subcircuit as, for example, identified above by reference numeral 236.

Figure 20:
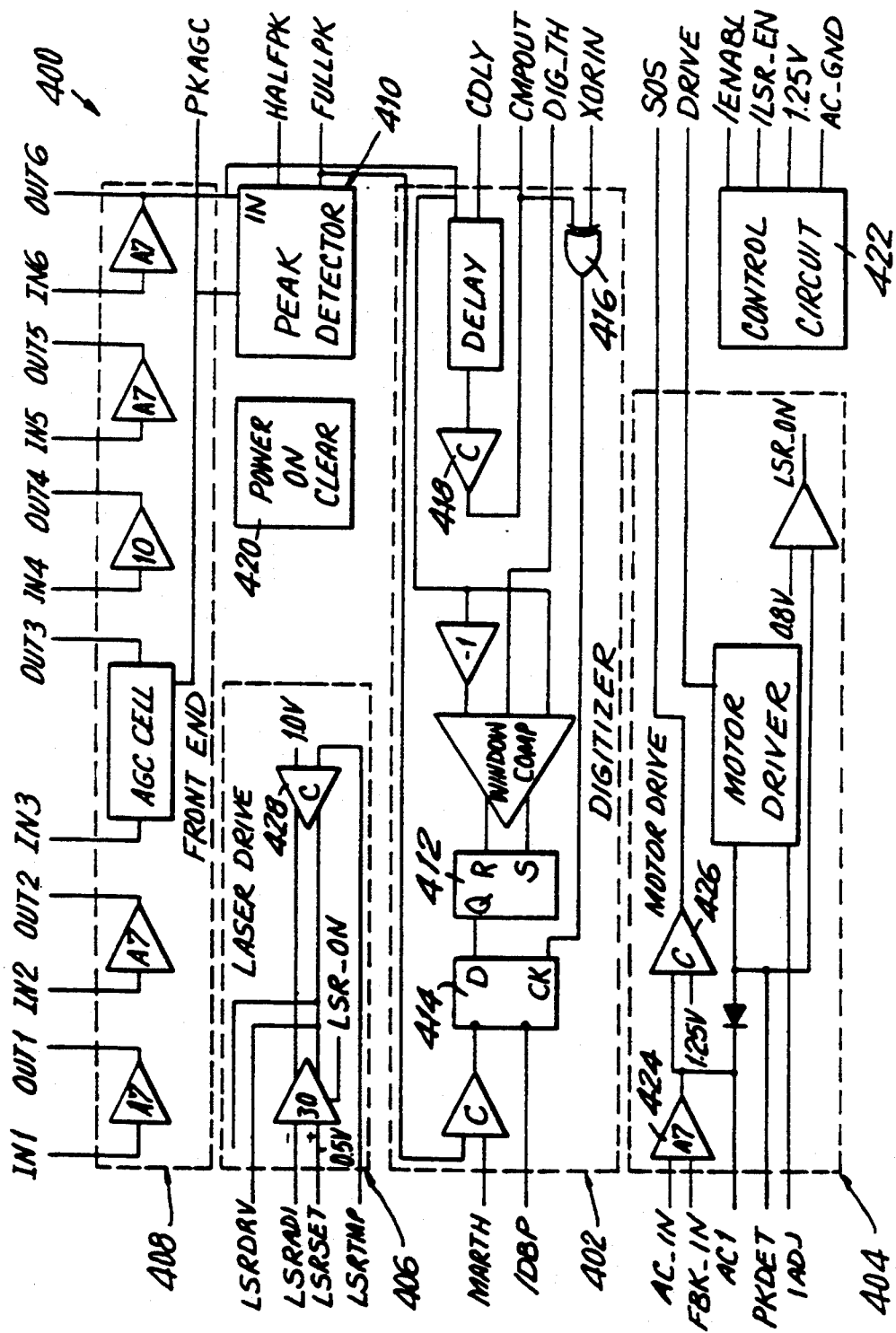
FIG. 20 is a block diagram of an integrated circuit chip on which a digitizer circuit is incorporated.

FIG. 20 depicts a single chip custom linear circuit 400 that incorporates many functions, thereby achieving a high performance scanner with much fewer components. The chip 400 includes a digitizer 402, such as the signal processing circuits 38, 200, 240, 250, 300 of FIGS. 2, 13, 15, 17 and 18, respectively; a motor drive circuit 404, such as identified by component 39 in FIG. 2; a laser drive circuit 406, such as identified by component 40 in FIG. 2; and a front end 408 including an automatic gain control circuit for controlling the gain (40 dB range) of the analog signal generated by the photosensor prior to being conducted to the digitizer circuit.

The front end 408 transforms the electrical current analog signal from the photosensor into a voltage signal, filters, amplifies and readies it for use by the digitizer. Conditioning of the signal includes proper amplification via the AGC cell as well as removal of noise and the effects of ambient light.

Total voltage gain is externally selectable and can be greater than 60 dB. Therefore, the current input node (IN1) is critically dependent on the integrated circuit as well as printed circuit board layout to minimize undesirable feedback and/or oscillation.

The equivalent input noise current and voltage of the first amplifier (IN1) is most critical since it determines the minimum detectable signal and therefore limits the dynamic range of the whole system. Layout which minimizes crosstalk for this first stage is paramount. Trenching, if at all possible, and techniques for limiting substrate currents are highly desirable.

Also important is that the input bias current of the AGC control input (PKAGC), be minimized to reduce drooping on the peak detector capacitor voltage between scans which is typically 27 msec. The capacitor is held to 1 $\mu$F or less for the purposes of maintaining fast AGC attack times and a physical size that is consistent with the scanner's application.

A peak detector 410 consists of a phase splitter/buffer input stage and two full wave and a single wave peak detector stage. The split buffered signal is used to feed the digitizer 402 as well as the peak detector's source followers. The peak detector's output transistors are capable of supplying the surge current needed to quickly charge the loading capacitor (as limited by the series resistors), and are also capable of withstanding the worst case reverse voltage (e.g., greater than 5 volts) without breaking down.

The peak detector 410 is used to feedback a control voltage signal for the AGC cell; to provide a signal tracking threshold for the digitizer's window comparator; and to feed signal status information to the digitizer's MARGIN circuit, in those applications where the AGC cell is not used.

The digitizer 402 is the heart of the scanner. It is here that the conditioned analog signal is analyzed and broken down to create the electronic equivalent of the bar code symbol being read. One branch of the digitizer is a window comparator with a variable threshold.

The threshold tracks the analog signal's amplitude, to maintain the highest possible signal-to-noise ratio for all possible amplitudes.

Such provision allows highly accurate reads every single scan, when the signal levels are high enough, but will adapt itself for a lower signal-to-noise ratio, for those times when the signal is feeble and a few scans might be required to obtain a read.

The output pulses of the window comparator are used to trigger the SET (S) and RESET (R) inputs of a flip-flop 412, thus producing a square wave that is representative of the symbol being read. For precise timing information (i.e., phase), an additional D-type flip-flop 414 is used and is clocked from the output of the exclusive-OR gate 416 which is part of a delay loop branch of the digitizer. The delay loop is used to extract timing information from the incoming signal so that phase distortion due to transitional speed and circuit response variation is virtually eliminated. It works by first delaying the signal and then feeding it and its delayed self to the two inputs of a comparator 418 with a properly selected amount of hysteresis.

The amount of the delay is selected so that the signal and its delayed version cross (and therefore cause the comparator to change state) at a point near the peaks, thus providing a degree of noise immunity higher than that possible at the zero crossing transitions, which yields less overall phase distortion.

The first derivative of the square wave so generated at the output of the comparator 418 is then fed to the exclusive-OR gate 416 (which is nothing more than another window comparator with fixed thresholds), the output of which is then used to clock the symbol data out of the D-type flip-flop 414, with a greater degree of phase integrity than would otherwise be possible.

The comparator 418 has the most demanding requirements for this subcircuit, because it must respond to signals whose peak amplitude is as low as 50 mV. The comparator 418 changes states very close to signal peaks and allows for as much as 15 mV of hysteresis. Hence, the gain and bandwidth must be as large as possible (135 dB of DC gain; 85 dB at 2 MHz and 0 dB at 43 MHz are preferred values under conditions of 5 V when biased for low frequency mode).

A response delay of no more than 600 nsec for 10 mV overdrive under the conditions of low frequency mode bias is needed, with 300 nsec desirable.

The difference between rise time delay and fall time delay (at 10 mV overdrive) must be less than 450 nsec for the low frequency mode bias and 250 nsec for the high frequency mode bias to maintain phase distortion within tolerable limits. Delay difference of less than 100 nsec is highly desirable for both conditions.

The output stage of the comparator must be capable of swinging to within 1 V from each rail as a minimum when driving a load of 16K ohms (the input impedance of the gate 416 is 20K ohms ±20%).

The gate 416 output pulse width must be a minimum of 1.5 $\mu$sec as measured at the halfway point, for all conditions (worst case is low frequency mode) when the gate common input (XORIN) is coupled to the comparator output via a 15 pF to 22 pF capacitor. For adequate noise immunity the gate thresholds are set 250 mV above and below the common input DC level of 1 V.

The D-type flip-flop 414 must be capable of clocking data when the clock pulse width is 1.5 $\mu$sec.

The power-on clear circuit 420 is used to clear the flip-flop 414 and avoid overcharging of the peak detector's capacitors when power is first applied. This operation is necessary to insure that a decode is possible for the very first scan.

The power-on clear circuit 420 works by sensing the rail and the heavily bypassed AC GROUND hub. Its output is active until the voltage at AC GROUND reaches the value of 1 Vbe, at which point it becomes inactive, thus releasing the peak detector and flip-flop 414 for proper operation.

The control circuit 422 commands the whole chip operation. The way it does so is by generating all reference voltages and the AC GROUND used by all subcircuits.

Two input control lines are designed to allow open collector or CMOS drives. One input (/ENABL) activates a 1.25 V bandgap reference which, in turn, activates all subcircuits except the laser drive. When this one input has a high voltage, the circuit is disabled and draws a maximum of 100 $\mu$A (e.g., SLEEP MODE).

A low voltage applied to the other input (LSR.EN) enables the laser drive subcircuit 406 which requires that a low voltage be applied to /ENABL input, as well, for operation.

The motor drive circuit 404 is not interactive with any of those discussed thus far, except for the control circuit 422 which provides the 1.25V reference.

When first powering up, the output of a sensing amplifier 424 rises towards the AC GROUND voltage level (its rest state). This transition is coupled to the input of a driving amplifier 426 via an external capacitor.

The initial surge provides the initial kick that gets the motor started. Once started, a sensing coil will provide the induced EMF to the sensing amplifier which then commands the driving amplifier to provide the regenerative drive to the motor coil. The motor acts as a high Q feedback element to control the oscillating frequency.

The output of the driving amplifier is used to drive a start-of-scan (SOS) external comparator which changes state every time the signal crosses zero.

The laser drive circuit 406 consists mainly of an operational amplifier, whose inputs are lowpass filtered to prevent high frequency noise (e.g., RF, EMI) from being integrated by the amplifier and damaging the laser by overdriving it.

This amplifier also has two outputs. One can source up to 5 mA of current to be used to drive an external drive that drives the laser, but can only swing to within one volt from Vcc.

A second one, which can only source or sink 60 $\mu$A, is used to drive an external FET that drives the laser and is capable of swinging to within 250 mV from each rail.

The LSRADJ input is used for the dual purpose of trimming the laser current via an external potentiometer to ground and also for sensing the feedback current from the photosensor. This allows the laser current to be set and continuously regulated.

The laser drive circuit 406 is shut down when any one or all of the following conditions are met:
(a) Over intensity condition;
(b) Motor failure condition;
(c) Over temperature condition;
(d) A logic high signal applied at the LAS.EN terminal.

An over intensity condition is sensed via the laser diode's internal monitor photosensor (which also provides continuous regulation) by direct connection into the amplifier feedback loop at the LSRADJ input terminal.

A motor failure condition is controlled by the motor drive circuit and shuts down the laser if the motor fails to swing above a predetermined swing amplitude.

An over temperature condition is controlled by a comparator 428, which compares an internally set reference voltage to one obtained by voltage division of the bandgap reference, via an external resistor-thermistor pair that is connected to the comparator's remaining input, externally ported as "LSRTMP".

Figure 21:
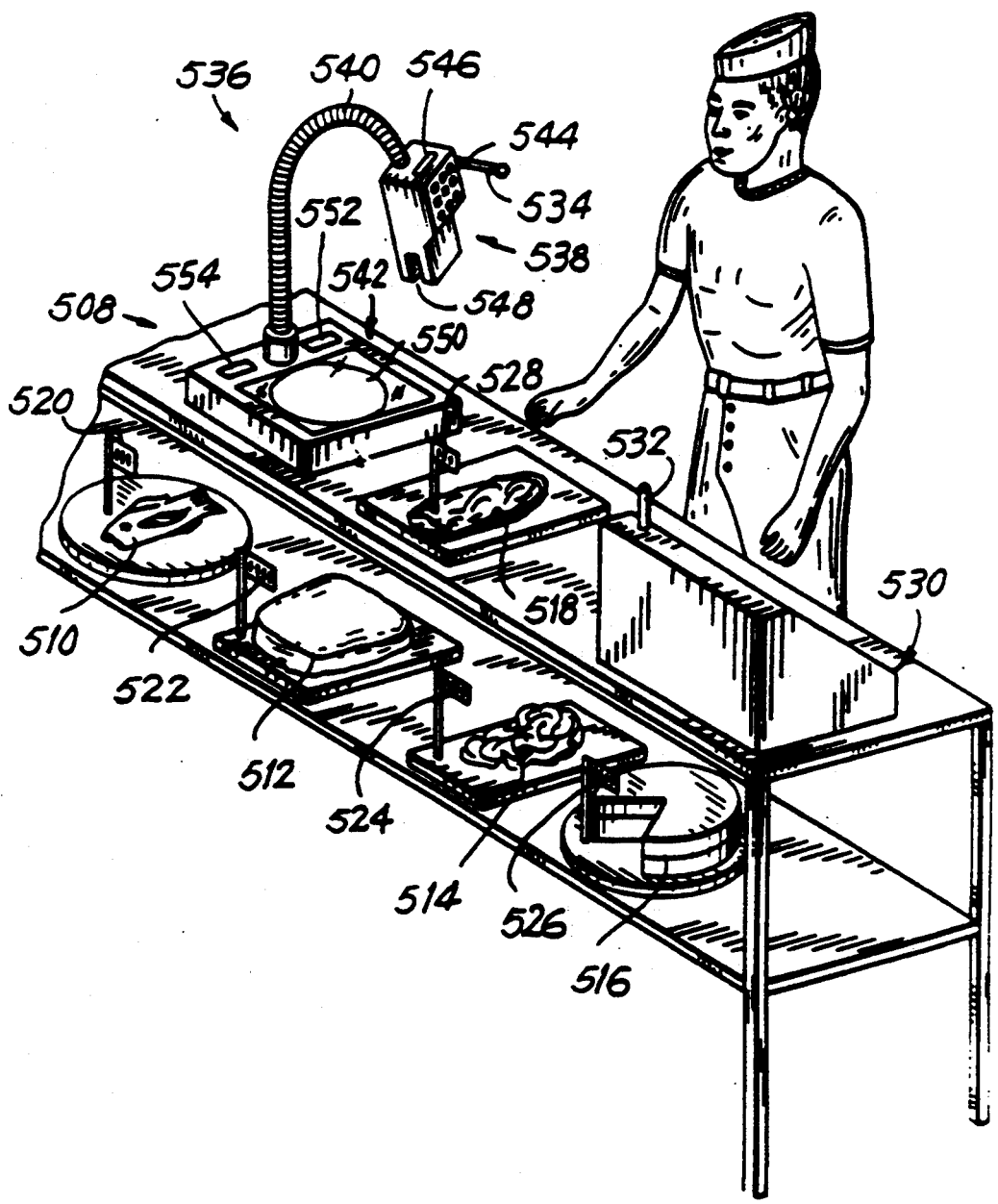
FIG. 21 is a perspective view of a point-of-sale system with a stand-alone scanner in use.

The above-described scanners and signal processing circuits are useful in many applications, especially at retail outlets. For example, as shown in FIG. 21, a point-of-transaction counter 508, such as an appetizing counter, has a plurality of appetizing products such as fish 510, meat 512, potato salad 514, cheese 516, salami 518, just to mention a few exemplary choices. Each product is associated uniquely with a bar code symbol. For example, flags 520, 522, 524, 526, 528 bear unique coded symbols which, when electro-optically scanned, decoded and read, respectively identify the products 510, 512, 514, 516, 518.

The counter 508 also includes a cash register 530 of the type having a conventional cash drawer, a keyboard, a display, and a paper receipt tape assembly, together with an antenna 532 which is in radio frequency communication with an antenna 534 of a countertop scanner 536. A clerk stands behind the counter 508 and operates the scanner 536 and the cash register 530.

The illustrated scanner 536 is a countertop-supported workstation and includes a head 538 mounted at one end of a semi-rigid, bendable column 540 whose other end is connected to a base 542. The head 538 is equipped with a keyboard 544, a display 546 and a card reader having a slot 548 through which magnetically encoded customer cards, e.g., debit, credit or smart cards, are passed. The debit or credit cards are provided with a magnetic strip which can be read by the card reader to charge a purchase against a customer's account. The smart card is provided with an on-board chip embedded in the card and having an internal memory programmed with a line of credit against which the account can be charged. The base 542 is equipped with a weighing scale 550, an electronic surveillance tag deactivator 552, and a printer having an opening 554 through which paper tape and/or machine-readable and/or human-readable labels are passed. The scale has a weighing platform in the plane of the top wall of the base 542. The deactivator is mounted within the base and is operative to change the state of a tag associated with a product to deter theft. The printer is also mounted within the base, and ejects tape and/or labels for application to a product through opening 554.

In further accordance with this invention, the stand-alone scanner workstation previously described in FIG. 7 or FIG. 9, or the workstation described below in connection with FIGS. 22 and 23, could replace the workstation 536 of FIG. 21. The removability of the scanner from the fixture is a versatile tool, enabling the clerk to bring the scanner to an object, rather than bringing the object to the scanner.

In use, a customer walks up to the counter 508 and requests a portion of a particular product, such as salami 518. The clerk cuts and weighs the portion on scale 550 and aims the scanner 538 at the flag 528 to advise the system that the product being weighed is, in fact, salami. Such optical identification of the product prevents operator error.

With the product and its weight known, a local data base having price per unit weight information is interrogated, and a label is printed by printer 554. The label is applied to the salami portion, typically on a paper wrapping therefor.

During the weighing process, the clerk could check the display 546 to see that the correct product was identified, or could manually access the keyboard. After the label is applied to the product, a debit, credit or smart card can be passed through the reading slot 548 to charge the customer's account.

The illustrated scanner 538 is in wireless communication with the cash register 530, but could be hard wired thereto. Also, the scanner 538 need not be mechanically supported by the base 542, but could be mounted on a post or analogous support, fixed or manipulatable.

This invention is not intended to be limited to food counters, since any merchandise can be optically read in the manner described above. In a retail situation such as a clothing store, the tag deactivator 554 would be more useful.

Turning now to FIGS. 22 and 23, a flashlight-shaped scanner 600 is removably mounted on a stand including an upright 602 that is supported by a base 604 on a countertop. An electro-mechanical connector 606 allows quick attachment to and detachment from the stand. The connector 606 also makes electrical connections between electrical components in the scanner and the stand.

The scanner 600 may have all the components described above for scanner 10 in FIGS. 1–6, including an electro-optical reader for reading bar code symbols with a single line scan pattern or an omni-directional scan pattern, or preferably, a reader that is convertible from one scan pattern to another by the simple expedient of mounting the scanner 600 on the stand, as described above. The scanner 600 may also have communication channels with a decoder and other peripheral equipment, e.g., a scale, a printer, a tag deactivator, a credit, debit or smart card reader, etc., connected to the stand. The scanner also has signal processing circuitry of the type described above, a memory for temporary data storage, and a power source. The power source may be an on-board rechargeable battery pack, or an energy storage component, e.g., a capacitor, capable of holding a predetermined amount of electrical power for a predetermined time after the scanner is removed from the stand.

When used in its normal mode of operation, the scanner 600 is mounted on the stand and, in this configuration, is used as a hands-free, stand-alone device. In this case, constant communication between the scanner and the peripheral equipment is on, and an information-carrying signal is conducted via the connector 606 to electrical components in the stand, or to peripheral equipment that is either hard-wired to, or in radio frequency telemetry with, the stand. This type of usage could be considered as the normal one at the retail point-of-sale terminal when relatively small packages need to be scanned.

However, when large size packages need to be processed, for instance, a bulky box or object carried in a shopping cart, the clerk will have to bring the scanner to the object. The scanner 600 is cordless, thereby not obstructing such removal. In use, the clerk will grasp the scanner and, via a quick disconnect, separate the scanner from the stand. Having an internal chargeable power supply which provides enough energy for a few minutes of scanner operation, the clerk can scan the symbol on the remote object or objects. In this case, the digital data could be temporarily stored in the memory and subsequently downloaded to a remote host computer.

It will be understood that each of the elements described above, or two or more together, also may find a useful application in other types of constructions differing from the types described above.

While the invention has been illustrated and described as embodied in a stand-alone fixture for converting the operation of a hand-held laser scanner, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A circuit for digitizing an analog electric signal generated from a photoelectronic conversion of light reflected off from scanning indicia having spatially-separated, light-reflective portions, comprising:

first differentiating means for differentiating the analog electric signal to generate a first differentiated signal;

means for receiving the first differentiated signal and generating a synchronizing signal corresponding to transitions in the spatially-separated, light-reflective portions of the indicia;

means for generating a first digital signal having transitions corresponding to the transitions of the spatially-separated, light-reflective portions of the indicia; and output means for receiving the synchronizing signal and the digital signal to produce a digital output signal having transitions corresponding to the transitions of the spatially-separated, light-reflective portions of the scanning indicia.

2. A circuit for digitizing an analog electric signal according to claim 1, wherein the means for generating the synchronizing signal comprises:

means for shifting the first differentiated signal by a predetermined amount to generate a shifted signal;

comparator means for comparing the first differentiated signal and the shifted signal to generate a comparator output signal; and means for receiving the comparator output signal and generating the synchronizing signal from the indicia being scanned.

3. A circuit for digitizing an analog electric signal according to claim 2, wherein the comparator output signal has transitions at each intersection between the first differentiated signal and the shifted signal.

4. A circuit for digitizing an analog electric signal according to claim 3, wherein the means for receiving the comparator output signal includes a logic gate for receiving the comparator output signal and generating, as the synchronizing signal, a pulse signal at the transitions of the comparator output signal.

5. A circuit for digitizing an analog electric signal according to claim 1, wherein the means for generating the first digital signal comprises:
   means for inverting the first differentiated signal and generating an inverted signal;
   a first peak detector, responsive to the inverted signal and the first differentiated signal, for generating a first peak signal;
   means for reducing the first peak signal to a predetermined level to generate a first reduced peak signal;
   means for comparing the first reduced peak signal to the inverted signal and generating a second digital signal;
   means for comparing the first reduced peak signal to the first differentiated signal and generating a third digital signal; and
   a logic circuit, responsive to the second and third digital signals, for producing the first digital signal.

6. A circuit for digitizing an analog electric signal according to claim 5, wherein the predetermined level is set to prevent noise signals from affecting the first and second digital signals.

7. A circuit for digitizing an analog electric signal according to claim 5, further comprising a threshold circuit for resetting the output means after each scanning, the threshold circuit comprising:
   a peak detector for detecting peaks of one of the inverted signal and the first differentiated signal and generating a second peak signal;
   means for reducing the second peak signal to generate a second reduced peak signal;
   means for comparing the second reduced peak signal to the first peak signal to generate an output reset signal; and
   applying the output reset signal to the output means to reset the output signal.

8. A circuit for digitizing an analog electric signal according to claim 7, wherein the threshold circuit prevents the output means from responding to noise signals having amplitudes less than the second reduced signal, thereby preventing the output means from responding to signals between scans.

9. A circuit for digitizing an analog electric signal according to claim 5, wherein the first reduced peak signal is at least above a threshold level to prevent the output means from responding to low level noise.

10. A circuit for digitizing an analog electric signal according to claim 5, wherein the inverting means includes an amplifier.

11. A circuit for digitizing an analog electric signal according to claim 5, wherein the first peak detector includes a first amplifier circuit for detecting peaks of the inverted signal and a second amplifier circuit for detecting peaks of the first differentiated signal.

12. A circuit for digitizing an analog electric signal according to claim 5, wherein the means for reducing the first peak signal to the predetermined level includes a voltage divider coupled to the first peak detector.

13. A circuit for digitizing an analog electric signal according to claim 5, wherein the logic circuit includes a flip-flop.

14. A circuit for digitizing an analog electric signal according to claim 1, further comprising a threshold circuit for resetting the output means after each scanning.

15. A circuit for digitizing an analog electric signal according to claim 1, wherein the output means includes a flip-flop and a transistor coupled to the flip-flop for outputting the digital output signal.

16. A method for digitizing an analog electric signal generated from a photoelectronic conversion of light reflected off from scanning indicia having spatially-separated, light-reflective portions, the method comprising the steps of:
   differentiating the analog electric signal to generate a first differentiated signal;
   receiving the first differentiated signal and generating a synchronizing signal corresponding to transitions in the spatially-separated, light-reflective portions of the indicia;
   generating a first digital signal having transitions corresponding to the transitions of the spatially-separated, light-reflective portions of the indicia; and
   receiving the synchronizing signal and the digital signal and producing a digital output signal having transitions corresponding to the transitions of the spatially-separated, light-reflective portions of the scanning indicia.

17. A circuit for digitizing an analog electric signal according to claim 16, wherein the step of generating the synchronizing signal comprises steps of:
   shifting the first differentiated signal by a predetermined amount to generate a shifted signal;
   comparing the first differentiated signal and the shifted signal to generate a comparator output signal; and
   receiving the comparator output signal and generating the synchronizing signal from the indicia being scanned.

18. A circuit for digitizing an analog electric signal according to claim 16, wherein the step of generating the first digital signal comprises the steps of:
   inverting the first differentiated signal and generating an inverted signal;
   generating, in response to the inverted signal and the first differentiated signal, a first peak signal;
   reducing the first peak signal to a predetermined level to generate a first reduced peak signal;
   comparing the first reduced peak signal to the inverted signal and generating a second digital signal;
   comparing the first reduced peak signal to the first differentiated signal and generating a third digital signal; and
   producing, in response to the second and third digital signals, the first digital signal.

* * * * *

UNITED STATES PATENT AND TRADEMARK OFFICE
CERTIFICATE OF CORRECTION

PATENT NO. : 5,436,440

DATED : July 25, 1995

INVENTOR(S) : Edward Barkan

It is certified that error appears in the above-identified patent and that said Letters Patent is hereby corrected as shown below:

In the Drawings:

Figures 13-17a and 17b-23 should be deleted.

Signed and Sealed this

Thirty-first Day of October 1995

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,436,440

DATED : July 25, 1995

INVENTOR(S) : Edward Barkan

It is certified that error appears in the above-identified patent and that said Letters Patent is hereby corrected as shown below:

Delete columns 1 through 24, and substitute therefore columns 1 through 14 as shown on the attached pages.

Signed and Sealed this

Ninth Day of April, 1996

Attest:

BRUCE LEHMAN

*Attesting Officer*  *Commissioner of Patents and Trademarks*

DIGITIZING CIRCUIT FOR A LASER SCANNER USING DIGITAL AND SYNCHRONIZING SIGNALS

CROSS-REFERENCE TO RELATED APPLICATIONS

This application is a divisional application of U.S. Ser. No. 028,107 filed Mar. 8, 1993, which is a continuation-in-part application of U.S. Ser. No. 721,951 filed Jun. 27, 1991, which is a divisional application of Ser. No. 510,074, filed Apr. 13, 1990, which is a continuation-in-part application of U.S. Ser. No. 367,335, filed Jun. 16, 1989, now U.S. Pat. No. 5,124,539. The contents of all the aforesaid applications are relied upon and incorporated by reference.

BACKGROUND OF THE INVENTION

1. Field of the Invention

This invention generally relates to a hand-held laser scanner for scanning and reading coded indicia, e.g., bar code symbols, with a first scan pattern and, more particularly, to a stand-alone fixture for selectively supporting the laser scanner thereon and, when so supported, for converting the first scan pattern to a different, second scan pattern operative for scanning and reading indicia located exteriorly of the fixture. Furthermore, various digitizer circuits are disclosed for signal processing.

2. Description of Related Art

Hand-held laser scanners are well known. See, for example, U.S. Pat. Nos. 4,387,297; 4,409,470 and 4,806,742 as being representative of the art. A stand-alone laser scanning workstation, for example, see U.S. Pat. No. 4,369,361, having built-in laser, scanning and sensor components is also known.

It is known in this art to construct a digital signal from an analog signal generated from a photoelectric transformation of light reflected off a symbol during scanning by using signal processing digitizing circuits which either use fixed threshold levels derived directly from the analog signal, or which compare a first derivative of the analog signal to a peak signal that follows the peaks of the analog signal. However, such known digitizing circuits are susceptible to errors due to such factors as high ambient light levels and noise, especially in cases where the reading beam spot is poorly focused, i.e., in long-range reading applications, or in reading very high density symbols.

SUMMARY OF THE INVENTION

Accordingly, the present invention is directed to a signal processing digitizing circuit that addresses limitations and disadvantages of the prior art.

One advantage of the present invention is a digital processing digitizing circuit that resists noise, high ambient light levels, and poor focusing conditions, and still provides a true and faithful digital reconstruction of a symbol being scanned.

To achieve these and other advantages, and in accordance with the purpose of the invention, as embodied and broadly described, a circuit for digitizing an analog electric signal generated from a photoelectronic conversion of light reflected off scanning indicia having spatially-separated, light-reflective portions, comprises first differentiating means for differentiating the analog electric signal to generate a first differentiated signal; means for receiving the first differentiated signal and generating a synchronizing signal corresponding to transitions in the spatially-separated, light-reflective portions of the indicia; means for generating a first digital signal having transitions corresponding to the transitions of the spatially-separated, light-reflective portions of the indicia; and output means for receiving the synchronizing signal and the digital signal to produce a digital output signal having transitions corresponding to the transitions of the spatially-separated, light-reflective portions of the scanning indicia.

In another aspect, a method for digitizing an analog electric signal generated from a photoelectronic conversion of light reflected off from scanning indicia having spatially-separated, light-reflective portions, the method comprising the steps of differentiating the analog electric signal to generate a first differentiated signal; receiving the first differentiated signal and generating a synchronizing signal corresponding to transitions in the spatially-separated, light-reflective portions of the indicia; generating a first digital signal having transitions corresponding to the transitions of the spatially-separated, light-reflective portions of the indicia; and receiving the synchronizing signal and the digital signal and producing a digital output signal having transitions corresponding to the transitions of the spatially-separated, light-reflective portions of the scanning indicia.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

Figure 3:
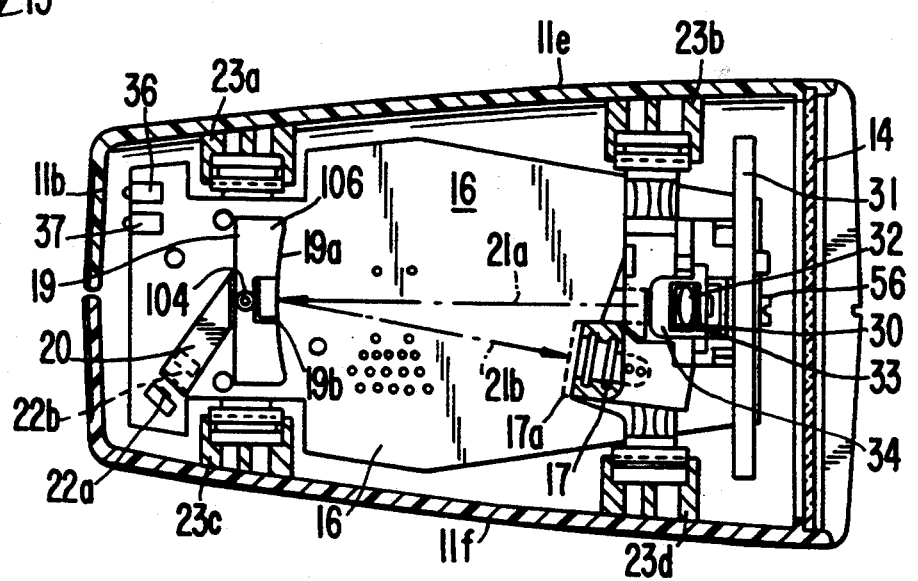
FIG. 3 is a sectional view taken on line 3—3 of FIG. 2.

FIG. 1 is a front elevational view of a hand-held scanner;

FIG. 2 is a sectional view taken on line 2—2 of FIG. 1;

FIG. 3 is a sectional view taken on line 3—3 of FIG. 2;

FIG. 4 is a perspective view of the scanner of FIG. 1 in one intended position of use;

FIG. 5 is a block diagram of one embodiment of a signal processing digitizing circuit in accordance with this invention;

FIG. 6 is a set of waveforms at various locations in the circuit of FIG. 5;

FIG. 7 is a block diagram of another embodiment of a signal processing digitizing circuit in accordance with this invention;

FIG. 8 is a set of waveforms at various locations in the circuit of FIG. 7;

FIG. 9(a) is an electrical schematic diagram of still another embodiment of a signal processing digitizing circuit in accordance with this invention;

FIG. 9(b) is an electrical schematic diagram of an alternative embodiment of the digitizing circuit depicted in FIG. 9(a);

FIG. 10 is an electrical schematic diagram of yet another embodiment of a signal processing digitizing circuit in accordance with this invention;

FIG. 11 is a set of waveforms at various locations in the circuit of FIG. 10; and FIG. 12 is a block diagram of an integrated circuit chip on which a digitizer circuit is incorporated.

DETAILED DESCRIPTION OF THE PREFERRED EMBODIMENTS

Referring first to FIGS. 1–4 of the drawings, reference numeral 10 generally identifies a lightweight (less than one pound), hand-held laser scanner supportable entirely by a user for use in a laser scanning system operative for reading, scanning and/or analyzing coded indicia, and aimable both prior to, and during, the reading thereof, by the user at the indicia, each in its turn. The term "indicia" or "symbol", as used interchangeably herein, is intended to cover indicia composed of different portions having different light-reflective properties at the wavelength of the light source, e.g., a laser, being utilized. The indicia may be the omnipresent Universal Product Code (UPC) bar code symbol, or any of the black and white industrial symbols, e.g., Code 39, Codabar, Interleaved 2 of 5, etc. The indicia may also be any alphabetic and/or numeric characters. The term "symbol" is also intended to cover indicia located in a background field, wherein the indicia, or at least a portion thereof, have a different light-reflectivity property than that for the background field. In this latter definition, the "reading" of the symbol is of particular benefit in the fields of robotics and object recognition.

Turning now to FIG. 1, the scanner 10 includes a generally gun-shaped housing having a handle portion 12 of generally rectangular cross-section and generally elongated along a handle axis, and a generally horizontally-elongated barrel or body portion 11. The cross-sectional dimension and overall size of the handle portion 12 is such that the scanner conveniently can fit and be held in a user's hand. The body and handle portions are constituted of a lightweight, resilient, shock-resistant, self-supporting material, such as a synthetic plastic material. The plastic housing preferably is injection-molded, but can be vacuum-formed or blow-molded to form a thin, hollow shell which bounds an interior space whose volume measures less than a value on the order of 50 cubic inches and, in some applications, the volume is on the order of 25 cubic inches or less. Such specific values are not intended to be self-limiting, but to provide a general approximation of the overall maximum size and volume of the housing. The shell is formed of two housing parts 12a, 12b, meeting along a generally vertical joining line 12c.

As considered in one intended position of use, i.e. as a hand-held scanner as shown in FIG. 4, the body portion 11 has a front prow region or nose having an inclined front wall 11a. The body portion 11 also has a rear region or stern having a rear wall 11b spaced rearwardly of the inclined front wall 11a. The body portion 11 also has a top wall 11c, a bottom wall 11d below the top wall 11c, and a pair of opposed side walls 11e, 11f between the top and bottom walls. The front wall 11a is sloped relative to the top and bottom walls.

A manually-actuatable, and preferably depressible, trigger 13 is mounted on a cantilever resilient arm 13a for movement relative to the housing in a forwardly-facing region where the handle and body portions meet and where the user's forefinger normally lies when the user grips the handle portion in the intended position of use. The bottom wall 11d has a lower opening, and the handle 12 has a forwardly-facing slot through which the trigger 13 projects and is moved. The arm 13a has one end overlying a trigger switch 25 which is switched from an open to a closed state upon depression of the trigger 13.

An exit window 14 is stationarily mounted at the nose and is light-transmissive to allow laser light to pass from the interior to the exterior of the housing, and vice versa.

A flexible, non-bulky, coil-type electrical cable 15 with multiple freedoms of movement interconnects the scanner to the remainder of the components of the laser scanning system, whose operation is explained in greater detail below.

A plurality of components are mounted in the scanner and, as explained below, at least some of them are actuated by the trigger 13, either directly or indirectly, by means of a control microprocessor. One of the components is an actuatable laser light source (see FIG. 3), e.g., a semiconductor laser diode 33, operative, when actuated by the trigger 13, for propagating and generating an incident laser beam whose light is visible or at least marginally visible to the human eye. The emitted laser diode beam is highly divergent; diverges differently in different planes parallel and perpendicular to the longitudinal direction of beam propagation; is non-radially symmetrical, i.e. anamorphic; and has a beam cross-section generally resembling an oval. The diode may be of the continuous wave or pulse type. The diode requires a low voltage (e.g., 12 v DC or less) supplied by a power regulator and a battery (DC) source which may be provided within the scanner, or by a re-chargeable battery pack accessory detachably mounted on the scanner, or by a power conductor in the cable 15 connected to the scanner from an external power supply (e.g., DC source).

In the prior art, analog signals do not have well-defined points indicative of each transition from a bar to a space, or vice versa, of a bar code symbol. The analog signal is characterized by gradually rising slopes which reach an amplitude peak and, thereupon, by gradually falling slopes which drop off from each peak. In such prior art signal processing circuits as described, for example, in U.S. Pat. No. 4,251,798, the analog signal itself was directly used to obtain maximum and minimum fixed threshold levels from which symbol transitions were determined. However, high ambient light levels adversely affected symbol reconstruction.

It was also proposed in such prior art as disclosed in U.S. Pat. No. 5,061,843 to utilize the first derivative of the analog signal and to utilize a peak detector in converting the analog signal to a digital signal. However, in certain situations where the reading spot was poorly focused, i.e., outside its depth of focus, for example, during long range scanning, it is insufficient to compare the first derivative signal with the peak detected signal. The peaks of the first derivative signal vary in amplitude, and very low amplitude peaks were not detected, thereby leading to errors in symbol reconstruction.

FIG. 5 depicts a signal processing circuit 200, and FIG. 6 depicts voltage waveforms at various locations in circuit 200. Circuit 200 includes a current-to-voltage converter 202 operative for converting the variable electric current generated by photosensor 17 during scanning of a symbol to a voltage. The variable voltage is then filtered by low pass-filter 204, thereby resulting in a filtered analog voltage signal (waveform A).

First differentiator 206 generates a first voltage signal (waveform C). The amplitude peaks of the first derivative signal closely approximate the true edge locations of the original bar code symbol. A positive peak detector 208 generates a peak signal (waveform B) that extends from one peak to the next. However, in poorly focused situations, certain peaks of the first derivative signal are very low in amplitude and are not picked up by the peak signal. Hence, as a first corrective measure, the peak signal is scaled down in voltage, typically by 50%, by a voltage divider 210. This scaled-down peak signal is depicted in dashed lines in FIG. 6 as the waveform B'.

A summing amplifier 212 adds the first derivative signal (waveform C) and the scaled-down peak signal (waveform B') to obtain a first sum signal (waveform D). An inverter 214 inverts the first derivative signal (waveform C) to obtain an inverted derivative signal (waveform E). The first sum signal (waveform D) and the inverted derivative signal (waveform E) are then compared in a comparator 216 to obtain a first comparator output signal (waveform H). The comparator output signal is comprised of pulses whose leading and trailing edge transitions are defined each time that waveforms D and E intersect. These transitions are conducted to the "Preset" input terminal of a flip-flop 218, and preset the flip-flop to a binary high logic level "1", thereby indicating positive-going edges.

To obtain the transitions that indicate negative-going edges, the inverted first derivative signal (waveform E) is conducted to another positive peak detector 220 to generate a peak inverted signal (waveform F). As before, a voltage divider 222 scales down the peak inverted signal, and this scaled-down signal is then summed, together with the inverted first derivative signal, in another summing amplifier 224 to generate a second sum signal (waveform G). The second sum signal (waveform G) and the first derivative signal (waveform C) are compared in another comparator 226 to obtain a second comparator output signal (waveform I) which, in turn, is conducted to the "Clear" terminal of the flip-flop 218 to provide the transitions indicative of the negative-going edges that clear the flip-flop 218. The flip-flop 218 generates an output signal (waveform L) which stores a binary high logic level "1" when each positive-going edge is detected, and a binary low logic level "0" when each negative-going edge is detected. This output signal (waveform L) is conducted to the data "D" terminal of another flip-flop 228.

A second differentiator 230 generates a second derivative signal (waveform J) which is fed to one input of a comparator 232 whose other input is grounded. The comparator output is fed through an R-C time delay circuit, and an exclusive OR gate to generate a clock signal (waveform K) in which a pulse is generated every time the second derivative signal (waveform J) passes through zero, i.e., every time the comparator 232 changes from one state to another.

The clock signal (waveform K) is conducted to the clock "Ck" terminal of the flip-flop 228 and, together with the output signal (waveform L) supplied by the flip-flop 218, causes the flip-flop 228 to generate an output digital signal (waveform M). The clock signal is used to clock the flip-flop 228 and to latch the edge direction stored in the flip-flop 218. In this manner, the true bar code edges are reconstructed from the analog signal. A margin threshold subcircuit 236 is used to clear the flip-flop 228, and its operation is described below in connection with FIGS. 9(a), 9(b) or FIG. 10.

Turning now to FIGS. 7 and 8, another embodiment of a signal processing circuit 240 is depicted together with explanatory waveforms. Like reference numerals identify like components. The converter 202, filter 204, differentiator 206, positive peak detector 208, voltage divider 210, summing amplifier 212 and inverter 214 are operative, as described above, to generate the waveforms A, B, B', C and D. In a departure from circuit 200, the summing amplifier 212 generates a first sum signal (waveform N) which is the sum of the scaled-down peak signal (waveform B') and the inverted first derivative signal (waveform E). The comparator 216 compares the first sum signal (waveform N) with the first derivative signal (waveform C) to generate a first comparator output signal (waveform S) which is conducted to the "Clear" terminal of the flip-flop 218. The transitions of the first comparator output signal clear the flip-flop 218 to a binary low logic level "0", thereby indicating each negative-going edge.

To obtain transitions that indicate positive-going edges, a negative peak detector 238 detects the negative peaks of the first derivative signal (waveform C) to generate a negative peak signal (waveform P). A voltage divider 222 scales down the negative peak signal. A summing amplifier 224 sums this scaled-down signal with the inverted first derivative signal to obtain a second sum signal (waveform Q). The second sum signal and the first derivative signal are compared in the comparator 226 to generate a second comparator output signal (waveform R) which is then conducted to the "Preset" terminal of the flip-flop 218. The transitions of the second comparator output signal (waveform R) indicate positive going edges. The flip-flop 218 generates an output signal (waveform L) wherein a binary high logic level "1" is stored by the flip-flop 218 when a positive going edge is detected, and stores a binary low logic level "0" when a negative going edge is detected.

As before, a second differentiator 230 generates a second derivative signal (waveform J) and a clock signal (waveform K) that is fed to the clock "Ck" terminal of the flip-flop 228 whose output digital signal (waveform M) is a digital reconstruction of the symbol.

Hence, rather than using fixed threshold levels derived directly from the analog signal, or comparing the first derivative signal to a peak signal as was done in the prior art, this invention compares the first derivative signal to the sum of the peak signal plus an inverted version of the first derivative signal. Hence, added performance is gained, especially when the contrast levels of the analog signal are low. For example, as shown in the region X in FIG. 8, the contrast level of the analog signal is low. Sometimes the peak signal fails to cross under the peak of the first derivative signal, thereby leading to poor symbol reconstruction.

A simplified digitizing circuit 250 is depicted in FIGS. 9(a) and (b), and provides good digitizing accuracy even when the reading beam spot is much larger than the narrowest bars or spaces in the symbol being scanned. This makes it particularly good for use in long-range scanners, scanners for reading very high-density symbols, or scanners that are to be used where a large depth of focus is important. The digitizing circuit 250 can also provide excellent immunity to high levels of ambient light, including sunlight.

In FIG. 9(a), the analog signal is initially conducted to a first operational amplifier 252, preferably positioned early in a chain of amplifiers, configured as a differentiator to generate a first derivative signal. A second operational amplifier 254 configured as a differentiator is operative to generate a second derivative signal. A passive differentiator could be used here for simplicity. The first and second derivative signals are conducted to the pair of inputs of a comparator 256 whose digital output is conducted to a transistor 258.

A margin threshold subcircuit 260 includes a comparator 262, one input of which is supplied with the first derivative signal, and the other input of which is grounded. In particular, the noninverting input is supplied with the first derivative signal. As shown in FIG. 9(a) or 9(b), the diode (1N4148), which has a forward voltage drop of 0.7 V, provides a signal that is 0.7 V below the first derivative signal for the inverting input of the comparator 262. The diode prevents the two inputs of the comparator 262 from crossing due to noise on the first derivative signal that is less than 0.7 V. The output of comparator 262 is conducted to the base of a transistor 264 whose collector is connected to the output of the comparator 256. Accordingly, the margin threshold circuit 260 gates off the output of the digitizer circuit 250 when the amplitude of the first derivative signal is less than 0.7 V to allow a digitized bar pattern with clean margins.

FIG. 9(b) is another embodiment of the digitizing circuit 250 shown in FIG. 9(a). In the digitizing circuit of FIG. 9(b), the inverting input of comparator 256 is tied to an analog ground instead of a second derivative signal as in FIG. 9(a). Hence, the comparator 256 compares the clamped signal from the clamping circuit to analog ground to produce the output signal. The remaining portions of the embodiment of FIG. 9(b) is identical to FIG. 9(a).

The margin threshold circuit 260 of FIG. 9(b) may be identical to the margin threshold circuit of FIG. 9(a).

Another signal processing digitizing circuit 300 is set forth in FIG. 10 with explanatory waveforms depicted in FIG. 11.

A non-illustrated differentiator generates a first derivative signal of the analog signal. This first derivative signal (waveform AA) is applied to an input of the circuit 300. The signal polarity is such that negative peaks represent white-to-black transitions, and positive peaks represent black-to-white transitions, of the bar code symbol being scanned with light.

Operational amplifier 302 is operative to slightly delay the first derivative signal. The delayed first derivative signal is depicted in FIG. 11 by dashed lines as waveform BB. A comparator 304 compares the delayed first derivative signal (waveform BB) to the undelayed first derivative signal (waveform AA), and generates a comparator output signal (waveform CC).

Gate 306 generates a gate output signal or synchronizing signal (waveform DD) having a pulse at each rising and each falling transition at the output of comparator 304. The gate output signal (waveform DD) is then conducted to the clock "Ck" terminal of a flip-flop 308.

Operational amplifiers 310, 312, 314 together form a full wave peak detector 316, which causes capacitor C1 to be charged to the absolute value of the peaks of the first derivative signal. Capacitor C1 discharges through resistors R1 and R2. This peak voltage is displayed in FIG. 11 as waveform EE.

The voltage at the node between resistors R1 and R2 is a percentage of the voltage across capacitor C1 and, with the value shown, is about 27%. The resistors R1 and R2 serve as a voltage divider 318. The scaled-down voltage signal is depicted in FIG. 11 as waveform FF.

Comparator 320 compares this scaled-down peak signal (waveform FF) to the first derivative signal (waveform AA). Comparator 322 compares the same scaled-down peak signal (waveform FF) to an inverted version (waveform GG) of the first derivative signal. The inversion is performed by the amplifier 310. The output signal (waveform HH) of comparator 322 is connected to the "Preset" terminal of a flip-flop 324. The output signal (waveform II) of the comparator 320 is connected to the clear "Clr" terminal of the flip-flop 324.

As shown by waveform JJ, which is the output signal of the flip-flop 324, the flip-flop 324 flips to one state whenever positive peaks of the first derivative signal (waveform AA) exceed a percentage of the voltage on capacitor C1, the percentage being determined by the ratio of resistors R1 and R2. Flip-flop 324 flips to the other state when the positive peaks of the inverted first derivative signal (waveform GG) exceed the same percentage of the voltage on capacitor C1. Peaks on the first derivative signal (waveform AA) that do not exceed the percentage voltage are not sensed by the comparator 322 or by the comparator 320, and do not change the state of flip-flop 324. This prevents circuit 300 from responding to noise.

The output of flip-flop 324 is connected to the data "D" terminal of flip-flop 308. This causes the output of flip-flop 308, as shown by its output digital signal (waveform KK) to change state only upon the first pulse into its clock input after flip-flop 324 changes its state. Additional clock pulses, such as those caused by noise, are ignored. The gate output signal (waveform DD) occurs only at peaks of the first derivative signal as described above. Therefore, flip-flop 308 only changes its state when the first peak after the transition of flip-flop 324 occurs. The output digital signal (waveform KK) has transitions that accurately correspond to the peaks of the first derivative signal, except, of course, for the noise peaks which are ignored.

Resistor R3 in the voltage divider 318 prevents the peak detector 316 from discharging all the way to zero when there is no bar code symbol or other graphics being scanned. This keeps circuit 300 from responding to low level noise.

Operational amplifier 326 is used in another peak detector circuit 328, and charges capacitor C2 to the positive peak level of the inverted first derivative signal (waveform GG). These peaks correspond to the white-to-black transitions of the analog signal. Capacitor C2 is slowly discharged through resistors R4 and R5 which are part of another voltage divider 330. The resultant time constant is long enough so that capacitor C2 does not totally discharge between scans. The voltage at the node between resistors R4 and R5 is, with the values shown, one-half of the voltage of capacitor C2.

Another comparator 332 compares the voltage at the node between resistors R4 and R5 with the voltage out of the full wave peak detector. If a symbol is being scanned, the output of the full wave peak detector will be higher than the voltage at the other input of the comparator 332. This will cause the output of the comparator 332 to be low.

Shortly after the scanning spot moves off the last bar of the symbol being scanned, the capacitor C1 discharges until it has less than half of the voltage of capacitor C2. This causes the output of the comparator 332 to go high, thereby turning on a transistor 334. The output of transistor 334 is connected to the preset "PRE" terminal of the flip-flop 308, and presets the flip-flop 308, thereby insuring that the latter is in the proper state for the next scan to start. This also increases the immunity of the circuit 300 to noise between scans, as it prevents the flip-flop 308 from responding to anything that has an amplitude that is less than that existing at the node between the resistors R4 and R5, and serves as a margin threshold subcircuit as, for example, identified above by reference numeral 236.

FIG. 12 depicts a single chip custom linear circuit 400 that incorporates many functions, thereby achieving a high performance scanner with much fewer components. The chip 400 includes a digitizer 402, such as the signal processing circuits 38, 200, 240, 250, 300 of FIGS. 2, 5, 7, 9 and 10, respectively; a motor drive circuit 404, such as identified by component 39 in FIG. 2; a laser drive circuit 406, such as identified by component 40 in FIG. 2; and a front end 408 including an automatic gain control circuit for controlling the gain (40 dB range) of the analog signal generated by the photosensor prior to being conducted to the digitizer circuit.

The front end 408 transforms the electrical current analog signal from the photosensor into a voltage signal, filters, amplifies and readies it for use by the digitizer. Conditioning of the signal includes proper amplification via the AGC cell as well as removal of noise and the effects of ambient light.

Total voltage gain is externally selectable and can be greater than 60 dB. Therefore, the current input node (IN1) is critically dependent on the integrated circuit as well as printed circuit board layout to minimize undesirable feedback and/or oscillation.

The equivalent input noise current and voltage of the first amplifier (IN1) is most critical since it determines the minimum detectable signal and therefore limits the dynamic range of the whole system. Layout which minimizes crosstalk for this first stage is paramount. Trenching, if at all possible, and techniques for limiting substrate currents are highly desirable.

Also important is that the input bias current of the AGC control input (PKAGC), be minimized to reduce drooping on the peak detector capacitor voltage between scans which is typically 27 msec. The capacitor is held to 1 $\mu$F or less for the purposes of maintaining fast AGC attack times and a physical size that is consistent with the scanner's application.

A peak detector 410 consists of a phase splitter/buffer input stage and two full wave and a single wave peak detector stage. The split buffered signal is used to feed the digitizer 402 as well as the peak detector's source followers. The peak detector's output transistors are capable of supplying the surge current needed to quickly charge the loading capacitor (as limited by the series resistors), and are also capable of withstanding the worst case reverse voltage (e.g., greater than 5 volts) without breaking down.

The peak detector 410 is used to feedback a control voltage signal for the AGC cell; to provide a signal tracking threshold for the digitizer's window comparator; and to feed signal status information to the digitizer's MARGIN circuit, in those applications where the AGC cell is not used.

The digitizer 402 is the heart of the scanner. It is here that the conditioned analog signal is analyzed and broken down to create the electronic equivalent of the bar code symbol being read. One branch of the digitizer is a window comparator with a variable threshold.

The threshold tracks the analog signal's amplitude, to maintain the highest possible signal-to-noise ratio for all possible amplitudes.

Such provision allows highly accurate reads every single scan, when the signal levels are high enough, but will adapt itself for a lower signal-to-noise ratio, for those times when the signal is feeble and a few scans might be required to obtain a read.

The output pulses of the window comparator are used to trigger the SET (S) and RESET (R) inputs of a flip-flop 412, thus producing a square wave that is representative of the symbol being read. For precise timing information (i.e., phase), an additional D-type flip-flop 414 is used and is clocked from the output of the exclusive-OR gate 416 which is part of a delay loop branch of the digitizer. The delay loop is used to extract timing information from the incoming signal so that phase distortion due to transitional speed and circuit response variation is virtually eliminated. It works by first delaying the signal and then feeding it and its delayed self to the two inputs of a comparator 418 with a properly selected amount of hysteresis.

The amount of the delay is selected so that the signal and its delayed version cross (and therefore cause the comparator to change state) at a point near the peaks, thus providing a degree of noise immunity higher than that possible at the zero crossing transitions, which yields less overall phase distortion.

The first derivative of the square wave so generated at the output of the comparator 418 is then fed to the exclusive-OR gate 416 (which is nothing more than another window comparator with fixed thresholds), the output of which is then used to clock the symbol data out of the D-type flip-flop 414, with a greater degree of phase integrity than would otherwise be possible.

The comparator 418 has the most demanding requirements for this subcircuit, because it must respond to signals whose peak amplitude is as low as 50 mV. The comparator 418 changes states very close to signal peaks and allows for as much as 15 mV of hysteresis. Hence, the gain and bandwidth must be as large as possible (135 dB of DC gain; 85 dB at 2 MHz and 0 dB at 43 MHz are preferred values under conditions of 5V when biased for low frequency mode).

A response delay of no more than 600 nsec for 10 mV overdrive under the conditions of low frequency mode bias is needed, with 300 nsec desirable.

The difference between rise time delay and fall time delay (at 10 mV overdrive) must be less than 450 nsec for the low frequency mode bias and 250 nsec for the high frequency mode bias to maintain phase distortion within tolerable limits. Delay difference of less than 100 nsec is highly desirable for both conditions.

The output stage of the comparator must be capable of swinging to within 1 V from each rail as a minimum when driving a load of 16 K ohms (the input impedance of the gate 416 is 20 K ohms ±20%).

The gate 416 output pulse width must be a minimum of 1.5 $\mu$sec as measured at the halfway point, for all conditions (worst case is low frequency mode) when the gate common input (XORIN) is coupled to the comparator output via a 15 pF to 22 pF capacitor. For adequate noise immunity the gate thresholds are set 250 mV above and below the common input DC level of 2 V.

The D-type flip-flop 414 must be capable of clocking data when the clock pulse width is 1.5 $\mu$sec.

The power-on clear circuit 420 is used to clear the flip-flop 414 and avoid overcharging of the peak detector's capacitors when power is first applied. This operation is necessary to insure that a decode is possible for the very first scan.

The power-on clear circuit 420 works by sensing the rail and the heavily bypassed AC GROUND hub. Its output is active until the voltage at AC GROUND reaches the value of 1 Vbe, at which point it becomes inactive, thus releasing the peak detector and flip-flop 414 for proper operation.

The control circuit 422 commands the whole chip operation. The way it does so is by generating all reference voltages and the AC GROUND used by all subcircuits.

Two input control lines are designed to allow open collector or CMOS drives. One input (/ENABL) activates a 1.25V bandgap reference which, in turn, activates all subcircuits except the laser drive. When this one input has a high voltage, the circuit is disabled and draws a maximum of 100 μA (e.g., SLEEP MODE).

A low voltage applied to the other input (LSR.EN) enables the laser drive subcircuit 406 which requires that a low voltage be applied to /ENABL input, as well, for operation.

The motor drive circuit 404 is not interactive with any of those discussed thus far, except for the control circuit 422 which provides the 1.25V reference.

When first powering up, the output of a sensing amplifier 424 rises towards the AC GROUND voltage level (its rest state). This transition is coupled to the input of a driving amplifier 426 via an external capacitor.

The initial surge provides the initial kick that gets the motor started. Once started, a sensing coil will provide the induced EMF to the sensing amplifier which then commands the driving amplifier to provide the regenerative drive to the motor coil. The motor acts as a high Q feedback element to control the oscillating frequency.

The output of the driving amplifier is used to drive a start-of-scan (SOS) external comparator which changes state every time the signal crosses zero.

The laser drive circuit 406 consists mainly of an operational amplifier, whose inputs are low-pass filtered to prevent high frequency noise (e.g., RF, EMI) from being integrated by the amplifier and damaging the laser by overdriving it.

This amplifier also has two outputs. One can source up to 5 mA of current to be used to drive an external drive that drives the laser, but can only swing to within one volt from Vcc.

A second one, which can only source or sink 60 μA, is used to drive an external FET that drives the laser and is capable of swinging to within 250 mV from each rail.

The LSRADJ input is used for the dual purpose of trimming the laser current via an external potentiometer to ground and also for sensing the feedback current from the photosensor. This allows the laser current to be set and continuously regulated.

The laser drive circuit 406 is shut down when any one or all of the following conditions are met:
(a) Over intensity condition;
(b) Motor failure condition;
(c) Over temperature condition;
(d) A logic high signal applied at the LAS.EN terminal.

An over intensity condition is sensed via the laser diode's internal monitor photosensor (which also provides continuous regulation) by direct connection into the amplifier feedback loop at the LSRADJ input terminal.

A motor failure condition is controlled by the motor drive circuit and shuts down the laser if the motor fails to swing above a predetermined swing amplitude.

An over temperature condition is controlled by a comparator 428, which compares an internally set reference voltage to one obtained by voltage division of the bandgap reference, via an external resistor-thermistor pair that is connected to the comparator's remaining input, externally ported as "LSRTMP".

It will be understood that each of the elements described above, or two or more together, also may find a useful application in other types of constructions differing from the types described above.

While the invention has been illustrated and described as embodied in a stand-alone fixture for converting the operation of a hand-held laser scanner, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A circuit for digitizing an analog electric signal generated from a photoelectronic conversion of light reflected off from scanning indicia having spatially-separated, light-reflective portions, comprising:
    first differentiating means for differentiating the analog electric signal to generate a first differentiated signal;
    means for receiving the first differentiated signal and generating a synchronizing signal corresponding to transitions in the spatially-separated, light-reflective portions of the indicia;
    means for generating a first digital signal having transitions corresponding to the transitions of the spatially-separated, light-reflective portions of the indicia; and
    output means for receiving the synchronizing signal and the digital signal to produce a digital output signal having transitions corresponding to the transitions of the spatially-separated, light-reflective portions of the scanning indicia.

2. A circuit for digitizing an analog electric signal according to claim 1, wherein the means for generating the synchronizing signal comprises:
    means for shifting the first differentiated signal by a predetermined amount to generate a shifted signal;
    comparator means for comparing the first differentiated signal and the shifted signal to generate a comparator output signal; and
    means for receiving the comparator output signal and generating the synchronizing signal from the indicia being scanned.

3. A circuit for digitizing an analog electric signal according to claim 2, wherein the comparator output signal has transitions at each intersection between the first differentiated signal and the shifted signal.

4. A circuit for digitizing an analog electric signal according to claim 3, wherein the means for receiving the comparator output signal includes a logic gate for receiving the comparator output signal and generating, as the synchronizing signal, a pulse signal at the transitions of the comparator output signal.

5. A circuit for digitizing an analog electric signal according to claim 1, wherein the means for generating the first digital signal comprises:
   means for inverting the first differentiated signal and generating an inverted signal;
   a first peak detector, responsive to the inverted signal and the first differentiated signal, for generating a first peak signal;
   means for reducing the first peak signal to a predetermined level to generate a first reduced peak signal;
   means for comparing the first reduced peak signal to the inverted signal and generating a second digital signal;
   means for comparing the first reduced peak signal to the first differentiated signal and generating a third digital signal; and
   a logic circuit, responsive to the second and third digital signals, for producing the first digital signal.

6. A circuit for digitizing an analog electric signal according to claim 5, wherein the predetermined level is set to prevent noise signals from affecting the first and second digital signals.

7. A circuit for digitizing an analog electric signal according to claim 5, further comprising a threshold circuit for resetting the output means after each scanning, the threshold circuit comprising:
   a peak detector for detecting peaks of one of the inverted signal and the first differentiated signal and generating a second peak signal;
   means for reducing the second peak signal to generate a second reduced peak signal;
   means for comparing the second reduced peak signal to the first peak signal to generate an output reset signal; and
   applying the output reset signal to the output means to reset the output signal.

8. A circuit for digitizing an analog electric signal according to claim 7, wherein the threshold circuit prevents the output means from responding to noise signals having amplitudes less than the second reduced signal, thereby preventing the output means from responding to signals between scans.

9. A circuit for digitizing an analog electric signal according to claim 5, wherein the first reduced peak signal is at least above a threshold level to prevent the output means from responding to low level noise.

10. A circuit for digitizing an analog electric signal according to claim 5, wherein the inverting means includes an amplifier.

11. A circuit for digitizing an analog electric signal according to claim 5, wherein the first peak detector includes a first amplifier circuit for detecting peaks of the inverted signal and a second amplifier circuit for detecting peaks of the first differentiated signal.

12. A circuit for digitizing an analog electric signal according to claim 5, wherein the means for reducing the first peak signal to the predetermined level includes a voltage divider coupled to the first peak detector.

13. A circuit for digitizing an analog electric signal according to claim 5, wherein the logic circuit includes a flip-flop.

14. A circuit for digitizing an analog electric signal according to claim 1, further comprising a threshold circuit for resetting the output means after each scanning.

15. A circuit for digitizing an analog electric signal according to claim 1, wherein the output means includes a flip-flop and a transistor coupled to the flip-flop for outputting the digital output signal.

16. A method for digitizing an analog electric signal generated from a photoelectronic conversion of light reflected off from scanning indicia having spatially-separated, light-reflective portions, the method comprising the steps of:
   differentiating the analog electric signal to generate a first differentiated signal;
   receiving the first differentiated signal and generating a synchronizing signal corresponding to transitions in the spatially-separated, light-reflective portions of the indicia;
   generating a first digital signal having transitions corresponding to the transitions of the spatially-separated, light-reflective portions of the indicia; and
   receiving the synchronizing signal and the digital signal and producing a digital output signal having transitions corresponding to the transitions of the spatially-separated, light-reflective portions of the scanning indicia.

17. A circuit for digitizing an analog electric signal according to claim 16, wherein the step of generating the synchronizing signal comprises steps of:
   shifting the first differentiated signal by a predetermined amount to generate a shifted signal;
   comparing the first differentiated signal and the shifted signal to generate a comparator output signal; and
   receiving the comparator output signal and generating the synchronizing signal from the indicia being scanned.

18. A circuit for digitizing an analog electric signal according to claim 16, wherein the step of generating the first digital signal comprises the steps of:
   inverting the first differentiated signal and generating an inverted signal;
   generating, in response to the inverted signal and the first differentiated signal, a first peak signal;
   reducing the first peak signal to a predetermined level to generate a first reduced peak signal;
   comparing the first reduced peak signal to the inverted signal and generating a second digital signal;
   comparing the first reduced peak signal to the first differentiated signal and generating a third digital signal; and
   producing, in response to the second and third digital signals, the first digital signal.

* * * * *